United States Patent
Okazaki et al.

(10) Patent No.: US 6,238,019 B1
(45) Date of Patent: May 29, 2001

(54) HYDRAULIC STRUCTURE OF AUTOMATIC BRAKE CONTROL SYSTEM

(75) Inventors: Koji Okazaki, Takahama; Takahiro Kiso, Kariya; Kazutoshi Yogo, Aichi-ken; Sadayuki Ohno, Kariya; Takahiro Goshima, Gifu; Toshiya Morikawa, Kariya; Hiroyuki Shinkai, Oobu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/333,007

(22) Filed: Jun. 15, 1999

(30) Foreign Application Priority Data

Jun. 15, 1998 (JP) ............................................. 10-166460
Apr. 23, 1999 (JP) ............................................. 11-116660

(51) Int. Cl.[7] .................................................. B60T 8/48
(52) U.S. Cl. ........................................ 303/146; 303/113.2
(58) Field of Search ............................ 303/113.1, 113.2, 303/113.4, 113.5, 116.1, 116.2, 119.2, 139, 146

(56) References Cited

U.S. PATENT DOCUMENTS

| | | | |
|---|---|---|---|
| 5,188,437 | * 2/1993 | Willmann | 303/116.2 |
| 5,342,120 | * 8/1994 | Zimmer et al. | 303/113.2 |
| 5,383,718 | 1/1995 | Burgdorf et al. | 303/113.2 |
| 5,531,514 | 7/1996 | Nishii et al. | 303/116.1 |
| 5,549,366 | 8/1996 | Toda et al. | 303/113.2 |
| 5,586,814 | * 12/1996 | Steiner | 303/113.2 |
| 5,727,852 | 3/1998 | Pueschel et al. | 303/113.4 |
| 5,813,732 | * 9/1998 | Monzaki et al. | 303/146 |
| 5,967,628 | * 10/1999 | Abe et al. | 303/146 |
| 6,079,799 | * 6/2000 | Sawada et al. | 303/146 |

FOREIGN PATENT DOCUMENTS

| | | |
|---|---|---|
| 3843570 | 6/1990 | (DE) . |
| 4030858 | 4/1992 | (DE) . |
| 0841231 | 5/1998 | (EP) . |
| 2297134 | 7/1996 | (GB) . |
| 1-257653 | 10/1989 | (JP) . |
| 1-293258 | 11/1989 | (JP) . |
| 4-221264 | 8/1992 | (JP) . |
| 5-85325 | 4/1993 | (JP) . |
| 5-502838 | 5/1993 | (JP) . |
| 7-149220 | 6/1995 | (JP) . |
| 8-207734 | 8/1996 | (JP) . |
| 8-230634 | 9/1996 | (JP) . |
| 10-100876 | 4/1998 | (JP) . |

OTHER PUBLICATIONS

Zanten Van A T et al.: "Die Fahrdynamikregelung Von Bosch" Automatisierungstechnik —AT, DE, Oldenbourg Verlag, Munchen, vol. 44, No. 7, Jul. 1, 1996 (Jul. 7, 1997), pp. 359–365, XP000592696, ISSN: 0178–2312.

* cited by examiner

*Primary Examiner*—Christopher P. Schwartz
(74) *Attorney, Agent, or Firm*—Pillsbury Winthrop LLP

(57) ABSTRACT

A brake control apparatus for automotive vehicles is provided which has two separate hydraulic brake lines leading to wheel cylinders and performs a brake assisting operation to hold the wheel cylinder pressure higher than the master cylinder pressure in each of the hydraulic brake lines when a brake pedal is depressed by a vehicle operator. The brake control apparatus also includes a fluid pressure difference regulator which regulates a pressure difference between the two hydraulic brake lines so as to fall within a given allowable pressure range, thereby minimizing adverse effects on the brake assisting operation which are caused by electric and/or mechanical performance difference between the two hydraulic brake lines.

59 Claims, 22 Drawing Sheets

HYDRAULIC STRUCTURE OF AUTOMATIC BRAKE CONTROL SYSTEM

BACKGROUND OF THE INVENTION

1. Technical Field of the Invention

The present invention relates generally to an automatic brake control system for vehicles, and more particularly to an improved hydraulic circuit structure of a brake control system designed to regulate the braking effort applied to each wheel both in manual and automatic control modes.

2. Background Art

Japanese Patent First Publication No. 8-230634 teaches a brake control system which uses a brake assisting device in a hydraulic circuit extending from a master cylinder to wheel cylinders in order to eliminate the need for a vacuum brake booster and enhance the braking effort applied to each wheel upon urgent braking. This system is also capable of producing the wheel cylinder pressure higher than the master cylinder pressure to shorten the braking distance.

Such a brake control system usually has pumps, one in each hydraulic line, to provide the hydraulic pressure higher than the master cylinder pressure to wheel cylinders. In a case where a vehicle is equipped with two hydraulic lines: one being a front hydraulic line for front right and left wheels and the second being a rear hydraulic line for rear right and left wheels, if a difference in output between pumps disposed in the front and rear hydraulic lines is developed, it will result in a difference in braking effort applied to the front and rear wheels, but do not cause a vehicle body to undergo yawing. However, in a case where a vehicle is equipped with a diagonal hydraulic system (usually used in FF (front engine front drive) vehicles) consisting of a first hydraulic line for front right and rear left wheels and a second hydraulic line for front left and rear right wheels, if a difference in output between pumps disposed in the first and second hydraulic lines is developed, it will cause a vehicle body to yaw, which may result in instability of the braking.

SUMMARY OF THE INVENTION

It is therefore a principal object of the present invention to avoid the disadvantages of the prior art.

It is another object of the present invention to provide a brake control apparatus which is designed to minimize adverse effects, caused by a difference in electric and/or mechanical performance between two hydraulic brake lines, on a brake assisting operation which applies to each wheel the pressure of brake fluid higher than the master cylinder pressure produced by depression of a brake pedal by a vehicle operator.

It is a further object of the invention to provide a brake control apparatus designed to control instability of a vehicle body with high accuracy.

According to one aspect of the present invention, there is provided a brake control apparatus for a vehicle. The brake control apparatus comprises: (a) a master cylinder producing pressure of a brake fluid when braking the vehicle; (b) a first and a second wheel cylinder receiving the pressure of the brake fluid from the master cylinder pressure to apply braking efforts to a first and a second wheel, respectively; (c) a third and a fourth wheel cylinder receiving the pressure of the brake fluid from the master cylinder to applying braking efforts to a third and a fourth wheel, respectively; (d) a first hydraulic line connecting the master cylinder and the first and second wheel cylinders; (e) a second hydraulic line connecting the master cylinder and the third and fourth wheel cylinders; (f) a first pressure elevation/reduction actuator set disposed between the master cylinder and the first and second wheel cylinders in the first hydraulic line to selectively elevate and reduce the pressure of the brake fluid applied to the first and second wheel cylinders; (g) a second pressure elevation/reduction actuator set disposed between the master cylinder and the third and fourth wheel cylinders in the second hydraulic line to selectively elevate and reduce the pressure of the brake fluid applied to the third and fourth wheel cylinders; (h) a first differential pressure control valve disposed between the master cylinder and the first pressure elevation/reduction actuator set in the first hydraulic line, regulating flow of the brake fluid between a first portion of the first hydraulic line connecting with the master cylinder and a second portion of the first hydraulic line connecting with the first pressure elevation/reduction actuator set to control a difference in pressure of the brake fluid between the first and second portions; (i) a second differential pressure control valve disposed between the master cylinder and the second pressure elevation/reduction actuator set in the second hydraulic line, regulating flow of the brake fluid between a first portion of the second hydraulic line connecting with the master cylinder and a second portion of the second hydraulic line connecting with the second pressure elevation/reduction actuator set to control a difference in pressure of the brake fluid between the first and second portions of the second hydraulic line; (j) a first pump disposed in the first hydraulic line, delivering pressure of the brake fluid to the first and second wheel cylinders and returning an amount of the brake fluid equivalent to a required reduction in pressure of the brake fluid applied to the first and second wheel cylinders to the master cylinder; (k) a second pump disposed in the second hydraulic line, delivering pressure of the brake fluid to the third and fourth wheel cylinders and returning an amount of the brake fluid equivalent to a required reduction in pressure of the brake fluid applied to the third and fourth wheel cylinders to the master cylinder; (l) a first suction branch line connecting the first portion of the first hydraulic line and an inlet of the first pump; (m) a second suction branch line connecting the first portion of the second hydraulic line and an inlet of the second pump; (n) a first discharge branch line connecting an outlet of the first pump and the second portion of the first hydraulic line; (o) a second discharge branch line connecting an outlet of the second pump and the second portion of the second hydraulic line; (p) a connecting line connecting the second portion of the first hydraulic line between the first differential pressure control valve and the first pressure elevation/reduction actuator set and the second portion of the second hydraulic line between the second differential pressure control valve and the second pressure elevation/ reduction actuator set; and (q) a fluid pressure difference regulator disposed in the connecting line to regulate a difference between the pressure of the brake fluid in the second portion of the first hydraulic line delivered by the first pump and the pressure of the brake fluid in the second portion of the second hydraulic line delivered by the second pump so as to fall within a given allowable pressure range.

In the preferred mode of the invention, the fluid pressure difference regulator includes a pressure chamber and a piston disposed within the pressure chamber to block fluid communication between the first and second hydraulic lines. The piston is slidable within the pressure chamber so as to eliminate an excess of the pressure difference between the first and second hydraulic lines above the given allowable pressure range.

The fluid pressure difference regulator also includes a spring which has a preselected spring constant and which supports the piston within the pressure chamber.

The spring constant of the spring is set to a value which has the pressure difference between the first and second hydraulic lines fall within the given allowable pressure range.

The pressure chamber of the fluid pressure difference regulator has a volume which allows a desired pressure of the brake fluid to be produced in the second portion of one of the first and second hydraulic lines if the other of the first and second hydraulic lines is failing.

The first pressure elevation/reduction actuator set includes a plurality of pressure elevation control valves which control elevations in pressure of the brake fluid applied to the first and second wheel cylinders, respectively, and a plurality of pressure reduction control valves which control reductions in pressure of the brake fluid in the first and second wheel cylinders, respectively. Similarly, the second pressure elevation/reduction actuator set includes a plurality of pressure elevation control valves which control elevations in pressure of the brake fluid applied to the third and fourth wheel cylinders, respectively, and a plurality of pressure reduction control valves which control reductions in pressure of the brake fluid in the third and fourth wheel cylinders, respectively.

An electronic control unit is further provided which performs brake assisting control to actuate the first and second differential pressure control valves electrically so that the differences in pressure of the brake fluid between the first and second portions of the first hydraulic line and between the first and second portions of the second hydraulic line reach a target level when a brake pedal is depressed by a vehicle operator and when the vehicle is traveling at a speed higher than a preselected value.

The electronic control unit may actuate the first and second pumps and the first and second differential pressure control valves in the brake assisting control when the pressure of the brake fluid in the master cylinder increases above a given level.

A master cylinder pressure sensor is further provided which measures the pressure of the brake fluid in the master cylinder to provide a signal indicative thereof. The electronic control unit determines a rate of change in pressure of the brake fluid in the master cylinder based on the signal outputted from the master cylinder pressure sensor. When the rate of change exceeds a given value, the electronic control unit may actuate the first and second pumps and the first and second differential pressure control valves in the brake assisting control.

The electronic control unit may actuate the first and second pumps and the first and second differential pressure control valves in the brake assisting control to have the differences in pressure of the brake fluid between the first and second portions of the first hydraulic line and between the first and second portions of the second hydraulic line for elevating the pressures in the brake fluid in the second portions of the first and second hydraulic lines above the pressure of the brake fluid in the master cylinder reach the target level which is increased as a function of an increase in pressure of the brake fluid in the master cylinder.

A master reservoir is further provided which stores therein the brake fluid to be supplied to and returned from the master cylinder, a third suction branch line connecting the master reservoir and the inlet of the first pump. A check valve is further disposed in the third suction branch line which mechanically allows the brake fluid to flow from the master reservoir to the first pump and blocks flow of the brake fluid to the master cylinder from the first pump.

The check valve includes a valve body which is responsive to one of the pressure of the brake fluid produced by the master cylinder and the pressure of the brake fluid in the first and second wheel cylinders delivered by the first pump to block the third suction branch line.

The brake control apparatus also includes: a wheel speed sensor measuring speeds of the first to fourth wheels; a lateral momentum determining circuit determining a lateral momentum of a vehicle body during traveling; a vehicle state estimating circuit estimating a state of behavior of the vehicle body based on the speeds of the wheels measured by the wheel speed sensor and the lateral momentum determined by the lateral momentum determining circuit; a target braking effort determining circuit determining a target braking effort to be produced by each of the first to fourth wheel cylinders based on the state of behavior of the vehicle estimated by the vehicle state estimating circuit; and a braking effort regulating means for regulating the braking efforts produced by the first to fourth wheel cylinders so as to agree with the target braking efforts, respectively, to control behavior of the vehicle body.

The vehicle state estimating circuit includes wheel state variable determining means for determining a wheel state variable based on a difference in speed between a right one of the wheels and a left one of the wheels and estimates the state of behavior of the vehicle body based on the wheel state variable.

The wheels of the vehicle consists of a pair of front right and left wheels and a pair of rear right and left wheels. The wheel state variable determining means determines a front wheel state variable based on a difference in speed between the front right and left wheels and a rear wheel state variable based on a difference in speed between the rear right and left wheels. The vehicle state variable determining circuit estimates the state of behavior of the vehicle body based on the front and rear wheel state variables.

The wheel state variable means may alternatively determine a first diagonal wheel state variable indicative of stability in a diagonal direction of the vehicle body from the front right wheel to the rear left wheel based on a difference in speed between the front right wheel and the rear left wheel and a second diagonal wheel state variable indicative of stability in a diagonal direction of the vehicle body from the front left wheel to the rear right wheel based on a difference in speed between the front left and rear right wheels. The wheel state determining means estimates the state of behavior of the vehicle body based on the first and second diagonal wheel state variables.

The vehicle state estimating circuit may estimate the state of behavior of the vehicle body based on a front state variable and a rear state variable. The front state variable indicates stability of a front portion of the vehicle body and is determined based on a difference between the lateral momentum and the front wheel state variable. The rear state variable indicates stability of a rear portion of the vehicle body and is determined based on a difference between the lateral momentum and the rear wheel state variable.

The vehicle state estimating circuit may alternatively estimate the state of behavior of the vehicle body based on a first state variable and a second state variable. The first state variable indicates stability of a first diagonal portion of the vehicle body and is determined based on a difference between the lateral momentum and the first diagonal wheel state variable. The second state variable indicates stability of a second diagonal portion of the vehicle body and is determined based on a difference between the lateral momentum and the second diagonal wheel state variable.

The vehicle state estimating circuit determines a first state parameter indicating instability of the whole of the vehicle body based on the sum of the front and rear state variables and uses the first state parameter in estimating the state of behavior of the vehicle body.

The vehicle state estimating circuit may alternatively determine the first state parameter based on the sum of the first and second state variables and uses the first state parameter in estimating the state of behavior of the vehicle body.

The vehicle state estimating circuit determines a second state parameter indicating a location of a portion of the vehicle body which is unstable in behavior of the vehicle body based on a difference between the front and rear state variables and uses the second state parameter in estimating the state of behavior of the vehicle body.

The vehicle state estimating circuit may alternatively determine the second state parameter based on a difference between the first and second state variables and use the second state parameter in estimating the state of behavior of the vehicle body.

The vehicle state estimating circuit determines which of the wheels whose road-tire adhesion reaches a limit based on a value of the second state parameter.

The vehicle state estimating circuit classifies the state of behavior of the vehicle body into a plurality of different states based on the first and second state parameters.

The vehicle state estimating circuit classifies the state of behavior of the vehicle body into the different states by comparing the first state parameter with the second state parameter.

A turning state detecting means is provided for detecting a state of turning of the vehicle. The target braking effort determining circuit determines the target braking effort depending upon the state of turning of the vehicle.

The lateral momentum determining circuit includes either or both of a lateral acceleration sensor measuring a lateral acceleration acting on the vehicle body and a yaw rate sensor measuring a yaw rate of angular motion applied to the vehicle body.

According to the second aspect of the invention, there is provided a brake control apparatus for a vehicle. The brake control apparatus comprises: (a) a master reservoir storing therein a brake fluid; (b) a master cylinder connecting with the master reservoir, delivering pressure of the brake fluid to wheel cylinders when braking the vehicle; (c) a plurality of pressure control actuators disposed between the master cylinder and the wheel cylinders to selectively increase and decrease pressures of the brake fluid applied to the wheel cylinders, respectively; (d) a differential pressure control valve disposed between the master cylinder and the pressure control actuators to regulate flow of the brake fluid through a first hydraulic line connecting with the master cylinder and a second hydraulic line connecting with the pressure control actuators to control a difference in pressure of the brake fluid between the first and second hydraulic lines; (e) a pump delivering pressure of the brake fluid to the wheel cylinders and returning an amount of the brake fluid equivalent to a required reduction in pressure of the brake fluid applied to the wheel cylinders to the master cylinder; (f) a first suction line extending from the first hydraulic line to an inlet of the pump; (g) a second suction line connecting the master reservoir and the inlet of the pump; and (h) a check valve disposed in the second suction line, allowing the brake fluid to flow only to the inlet of the pump from the master reservoir.

According to the third aspect of the invention, there is provided a brake control apparatus for a vehicle. The brake control apparatus comprises: (a) a master reservoir storing therein a brake fluid; (b) a master cylinder connecting with the master reservoir, delivering pressure of the brake fluid to each of wheel cylinders when braking the vehicle; (c) a skid determining means for a skid of each of wheels; (d) an anti-skid control means for performing anti-skid control by regulating the pressure of the brake fluid applied to each of the wheel cylinders based on the skid determined by the skid determining means; (e) a pressure elevation control valve selectively elevating and holding the pressure of the brake fluid applied to each of the wheel cylinders during the anti-skid control; (f) a pressure reduction control valve selectively reducing and holding the pressure of the brake fluid applied to each of the wheel cylinders during the anti-skid control; (g) a reservoir storing therein an amount of the brake fluid equivalent to a reduction in pressure of the brake fluid applied to each of the wheel cylinders during the anti-skid control; (h) a pump returning the brake fluid in the reservoir to the master cylinder; (i) a differential pressure control valve disposed between the master cylinder and the pressure elevation control valve to regulate flow of the brake fluid through a first hydraulic line connecting with the master cylinder and a second hydraulic line connecting with the pressure elevation control valve to control a difference in pressure of the brake fluid between the first and second hydraulic lines; (j) a first suction line extending from the first hydraulic line to an inlet of the pump; (k) a second suction line connecting the master reservoir and the inlet of the pump; and (l) a check valve disposed in the second suction line, allowing the brake fluid to flow only to the inlet of the pump from the master reservoir.

According to the fourth aspect of the invention, there is provided a brake control apparatus for a vehicle. The brake control apparatus comprises: (a) a master reservoir storing therein a brake fluid; (b) a master cylinder connecting with the master reservoir, delivering pressure of the brake fluid to each of wheel cylinders when braking the vehicle; (c) a plurality of pressure control actuators disposed between the master cylinder and the wheel cylinders to selectively increase and decrease pressures of the brake fluid applied to the wheel cylinders, respectively; (d) a differential pressure control valve disposed between the master cylinder and the pressure control actuators to regulate flow of the brake fluid through a first hydraulic line connecting with the master cylinder and a second hydraulic line connecting with the pressure control actuators to control a difference in pressure of the brake fluid between the first and second hydraulic lines; (e) a pump delivering pressure of the brake fluid to the wheel cylinders and returning an amount of the brake fluid equivalent to a required reduction in pressure of the brake fluid applied to the wheel cylinders to the master cylinder; (f) a first suction line extending from the first hydraulic line to an inlet of the pump; (g) a second suction line connecting the master reservoir and the inlet of the pump; (h) a switch reservoir disposed in the first suction line which establishes fluid communication between the master cylinder and the inlet of the pump when the master cylinder delivers no pressure of the brake fluid and blocks the fluid communication in response to the pressure of the brake fluid produced by the master cylinder; (i) a check valve disposed in the second suction line, allowing the brake fluid to flow only to the inlet of the pump from the master reservoir; (j) a wheel speed sensor measuring speeds of the wheels; (k) a lateral momentum determining circuit determining a lateral momentum of a vehicle body during traveling; (l) a vehicle state estimating circuit estimating states of behavior of a plurality of portions of the vehicle body based on the speeds of the wheels measured by the wheel speed sensor, respectively; (m) a state parameter determining circuit comparing the lateral momentum determined by the lateral momentum determining circuit and the states of behavior estimated by the vehicle state estimating circuit to determine one of a first state parameter indicating instability of the whole of the vehicle body and a second state parameter indicating one of the portions of the vehicle body which is most unstable in behavior; (n) a target braking effort determining circuit determining a target braking effort to be produced by each of the wheel cylinders based on one of the first and second state parameters; and (o) a braking effort regulating means for regulating the braking efforts produced by the wheel cylinders so as to agree with the target braking efforts, respectively, to control behavior of the vehicle body.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 25 is a flowchart of a sub-program executed in step 1320 of

FIG. 22 to determine correction coefficients for basic controlled variables;

DESCRIPTION OF THE PREFERRED EMBODIMENT

Figure 1:
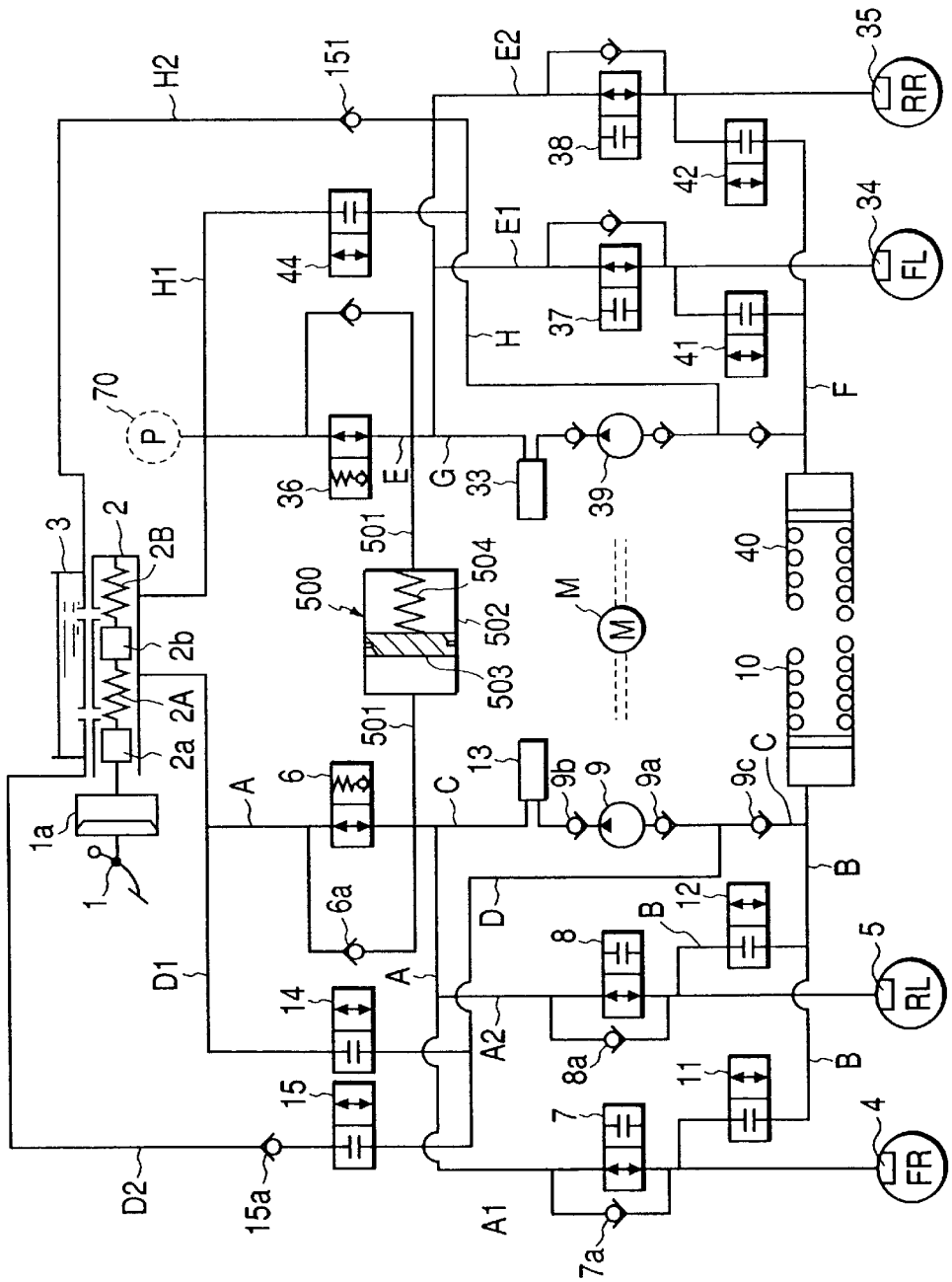
FIG. 1 is a hydraulic circuit diagram which shows a hydraulic system of a brake control apparatus according to the first embodiment of the invention.

Referring now to the drawings, wherein like numbers refer to like parts in several views, particularly to FIG. 1, there is shown a hydraulic system of an automotive brake control apparatus according to the first embodiment of the present invention which is designed to regulate the braking effort applied to each wheel for suppressing an unwanted change in behavior of the vehicle body. The illustrated embodiment is used with, as one example, a front-wheel drive vehicle equipped with a first hydraulic line for adjusting the braking force applied to a front right wheel FR and rear left wheel RL and a second hydraulic line for adjusting the braking force applied to a front left wheel FL and a rear right wheel RR.

A brake pedal 1 is connected to a master cylinder 2 which serves as a hydraulic source producing brake pressure to be applied to each wheel. The master cylinder 2 is a tandem master cylinder in which two hydraulic pressure chambers are provided, one for each of the front and rear hydraulic lines. When the brake pedal 1 is depressed by a vehicle operator, it pushes pistons 2a and 2b through a brake booster 1a to develop hydraulic pressure within the master cylinder 2. The piston 2a, the brake booster 1a, and the brake pedal 1 are connected mechanically through a rod. The pistons 2a and 2b are connected to each other through a spring. A liquid-tight seal is disposed between the periphery of the pistons 2a and 2 and an inner wall of the master cylinder 2 to hermetically seal primary and secondary chambers 2A and 2B defined by the pistons 2a and 2b within the master cylinder 2. Within the primary and secondary chambers 2A and 2B, substantially the same hydraulic pressures is developed by the pedal effort. The second spring is also disposed between the piston 2b and an inner end of the master cylinder 2. The second spring serves to urge the brake pedal 1 to return to its initial position when released to speed the reduction in pressure within the master cylinder 2.

A master reservoir 3 is disposed above the master cylinder 2 which is filled with brake fluid and which communicates with the primary and secondary chambers 2A and 2B in the master cylinder 2 through fluid paths formed between the master reservoir 3 and the master cylinder 2. The fluid paths between the master reservoir 3 and the master cylinder 2 each have the diameter much smaller than the inner diameter of the master cylinder 2 to function as an orifice which develops differential pressure of the brake fluid when flowing from the master cylinder 2 to the master reservoir 3. When the brake pedal 1 is depressed to move the pistons 2a and 2b to the right, as viewed in the drawing, so that they close the fluid paths to block the fluid communication between the master reservoir 3 and the master cylinder 2, it will cause pressure in the primary and secondary chambers 2A and 2B to be elevated to develop the master cylinder pressure (i.e., the brake pressure).

The master cylinder pressure is delivered to first and second hydraulic lines A and E. The first and second hydraulic lines A and E, as clearly shown in FIG. 1, have substantially the same part of construction, and explanation of part of the second hydraulic line B identical with that of the first hydraulic line A will be omitted here.

The first hydraulic line A has a pair of branch lines A1 and A2 which lead to a wheel cylinder 4 for the front right wheel FR and a wheel cylinder 5 for the rear left wheel RL, respectively. The wheel cylinders 4 and 5 each develop the wheel cylinder pressure acting as the braking force.

The first hydraulic line A has a differential pressure control valve 6 disposed upstream of the branch lines A1 and A2. The differential pressure control valve 6 is a two-position valve switchable between an open position and a differential pressure position. In the differential pressure position, the flow of the brake fluid both from the master cylinder 2 and from the wheel cylinders 4 and 5 is inhibited basically, but the flow of the brake fluid from the wheel cylinders 4 and 5 to the master cylinder 2 is allowed only when the fluid pressure in the wheel cylinders 4 and 5 exceeds the master cylinder pressure plus a set pressure (e.g., 50 kgf/cmm$^2$). The master cylinder pressure is not elevated above a set pressure. The pressure in the wheel cylinders 4 and 5 is, thus, held below a preselected level, thereby avoiding an excessive elevation in pressure in the first hydraulic line A which would cause breakage thereof. A check valve 6a is disposed in parallel to the differential pressure control valve 6. The check valve 6a allows the brake fluid to flow only from the master cylinder 2 to the wheel cylinders 4 and 5.

The branch lines A1 and A2 have disposed therein pressure elevation control valves 7 and 8, respectively, which selectively establish or block communication between the wheel cylinders 4 and 5 and the master cylinder 2 or an outlet port of a pump 9 during anti-skid control or vehicle behavior control. Check valves 7a and 8a are disposed in parallel to the pressure elevation control valves 7 and 8 which allow the brake fluid to flow only from the wheel cylinders 4 and 5 to the differential pressure control valve 6, respectively.

Hydraulic lines B extend from portions of the branch lines A1 and A2 between the pressure elevation control valves 7 and 8 and the wheel cylinders 4 and 5, respectively, and connect with a reservoir 10. The hydraulic lines B have disposed therein pressure reduction control valves 11 and 12 which regulate the flow of the brake fluid from the wheel cylinders 4 and 5 to the reservoir 10 to control reduction in pressure in the wheel cylinders 4 and 5, respectively.

The pressure elevation control valves 7 and 8, the pressure reduction control valves 11 and 12, and the reservoir 10 form a first pressure regulating actuator in the first hydraulic line A.

The pump 9 is disposed in a hydraulic line C extending from the reservoir 10 to the differential pressure control valve 6 and the wheel cylinders 4 and 5. Check valves 9a and 9b are installed across the pump 9 which allow the brake fluid to flow only from an inlet port to the outlet port of the pump 9. The check valves 9a and 9b may be built in the pump 9. The pump 9 may be a piston pump or a trochoid pump. The trochoid pump usually has a small fluid-flow pulsation and thus is useful when the pump 9 is activated frequently to perform a brake assist function. The pump 9 is driven by a motor M which also drives a pump 39 installed in the second hydraulic line E.

The brake fluid discharged from the pump 9 passes through a damper 13. The damper 13 suppresses the pulsation of the brake fluid from the pump 9. Instead of the damper 13, an orifice or restriction is formed in the hydraulic line C.

The pump 9 sucks the brake fluid not only from the reservoir 10, but also from the primary chamber 2A of the master cylinder 2 and the master reservoir 3 through the hydraulic line D. The hydraulic line D connects at one end with the inlet port of the pump 9 and at the other end with branch lines D1 and D2 which lead to the primary chamber 2A and the master reservoir 3, respectively. The branch line D1 has disposed therein a control valve 14. The branch line D2 has disposed therein a check valve 15. The control valve 14 selectively establishes and blocks communication between the pump 9 and the primary chamber 2A. The check valve 15 allows the brake fluid to flow only from the master reservoir 3 to the inlet port of the pump 9. A check valve 9c is disposed in the hydraulic line C between the pump 9 and the reservoir 10 to inhibit the brake fluid entering the inlet port of the pump 9 from the primary chamber 2A or the master cylinder 3 from flowing into the reservoir 10. This is because there is a possibility that the flow of the brake fluid into the reservoir 10 from the primary chamber 2A or the master reservoir 3 disturbs the reduction in wheel cylinder pressure during the anti-skid control or the vehicle behavior control.

In a normal braking mode in which the brakes are applied to the vehicle only by depression of the brake pedal 1, all the valves in the first hydraulic line A are in the illustrated positions so that the pressure in the primary chamber 2A is applied to the wheel cylinders 4 and 5 through the differential pressure control valve 6 and the pressure elevation control valves 7 and 8.

The second hydraulic line E, as can be seen from the drawing, has substantially the same structure as that of the first hydraulic line A. Specifically, the differential pressure control valve 36 is identical with the differential pressure control valve 6. The pressure elevation control valves 37 and 38 are identical with the pressure elevation control valves 7 and 8. The pressure reduction control valves 41 and 42 are identical with the pressure reduction control valves 11 and 12. The reservoir 40 is identical with the reservoir 10. The hydraulic line H and the branch lines H1 and H2 are identical with the hydraulic line D and the branch lines D1 and D2. The control valve 44 is identical with the control valve 14. The pump 39 is identical with the pump 9.

The installation of the branch lines D2 and H2 in the first and second hydraulic lines A and E for pumping the brake fluid out of the master reservoir 3 is for the following reasons. Usually, the deceleration of the vehicle body during braking causes the load of the vehicle body to be shifted forward, thereby resulting in an increase in braking ability of the front wheels. This is also evident from a known ideal braking force distribution curve. Specifically, a longitudinal braking force (i.e., a road surface gripping force) and a lateral braking force (i.e., a side force) developed by the front wheels become greater than those developed by the rear wheels. The application of braking effort to at least one of the front right and left wheels is, thus, effective in controlling the vehicle behavior. However, when the brake pedal 1 is not depressed by the vehicle operator so that no master cylinder pressure is produced, it is difficult for each of the pumps 9 and 39 to suck the brake fluid from the primary chamber 2A of the master cylinder 2 to elevate the wheel cylinder pressure quickly because a brake fluid passage between the master reservoir 3 and the primary chamber 2A works as a restriction to create a flow resistance in combination with negative pressure developed in the primary chamber 2A when the pump 9 sucks the brake fluid from the master reservoir 3 through the master cylinder 2. In order to avoid this problem, the pumps 9 and 39 are connected to the master reservoir 3 through the branch lines D2 and H2 to allow the pumps 9 and 39 to suck the brake fluid out of the master reservoir 3 at a less flow resistance.

A connecting line 501 extends between the first and second hydraulic lines A and E and communicates with the first pressure regulating actuator consisting of the differential pressure control valve 6, the pressure elevation control valves 7 and 8, and the damper 13 and with the second pressure regulating actuator consisting of the differential pressure control valve 36, the pressure elevation control valves 37 and 38, and the damper 33. Disposed in the connecting line 501 is a fluid pressure difference regulating unit 500 which has a piston 503 installed in a pressure chamber 502 defined within a unit casing. The piston 503 is in liquid-tight engagement with an inner wall of the unit 500 through a sealing member such as an O-ring to block fluid communication between the hydraulic lines A and E. The piston 503 is connected with a side wall of the unit 500 leading to the hydraulic line E through a spring 504 so that it may be moved horizontally, as viewed in the drawing, as a function of a difference in pressure between the hydraulic lines A and E. The spring 504 has a spring constant lying within a range which allows a preselected pressure difference between the wheel cylinders 4 and 5 in the first hydraulic line A and the wheel cylinders 34 and 35 in the second hydraulic line E and which depends upon the sizes of calipers, brake discs, and pads usually different according to the type of vehicle. If an allowable pressure difference between the first and second hydraulic lines A and E is 2 atmosphere, the spring constant is so determined that the piston 503 may be kept in position as is when a difference in wheel cylinder pressure between the first and second hydraulic lines A and E lies within a range of 0 to 2 atm., while, when the wheel cylinder pressure difference exceeds 2 atm., it may move to a lower pressure side so as to eliminate an excess of the wheel cylinder pressure difference above 2 atm. The pressure difference between the first and second hydraulic lines A and E the fluid pressure difference regulating unit 500 can absorb depends upon the volume of the pressure chamber 502, in other words, a displaceable distance of the piston 503. It is, thus, advisable that the volume of the pressure chamber 502 be determined taking into account some factors in producing the pressure difference between the first and second hydraulic lines A and E such as a mechanical performance difference between the pumps 9 and 39 resulting in a difference in suction/discharge power therebetween, a mechanical or electrical performance difference between the differential pressure control valves 6 and 36, and a dimensional difference in inner diameter between fluid passages through the control valves 14 and 44 (i.e., a difference in fluid resistance) resulting from a difference in degree to which the control valves 14 and 44 are opened due to mechanical or electrical errors thereof.

Specifically, the mechanical performance difference between the pumps 9 and 39 resulting in the difference in suction/discharge power therebetween is usually caused by mechanical errors such as dimensional and assembling errors of mechanical parts of the pumps 9 and 39. The mechanical performance difference between the differential pressure control valves 6 and 36 is caused by mechanical errors such as a locational error between a valve body and a valve seat and an error of a spring constant of an internal spring acting on the valve body to produce a pressure difference between hydraulic paths on both sides thereof leading to the master cylinder and the wheel cylinders. The electrical performance difference between the differential pressure control valves 6 and 36 is caused by, for example, an electrical difference in power supplied thereto which arises from errors in resistance value of busbars working as power supply circuits and changes in resistance value of lead wires of electric circuits with time. The same is true for the mechanical and electrical performance difference between the control valves 14 and 44.

Figure 2:
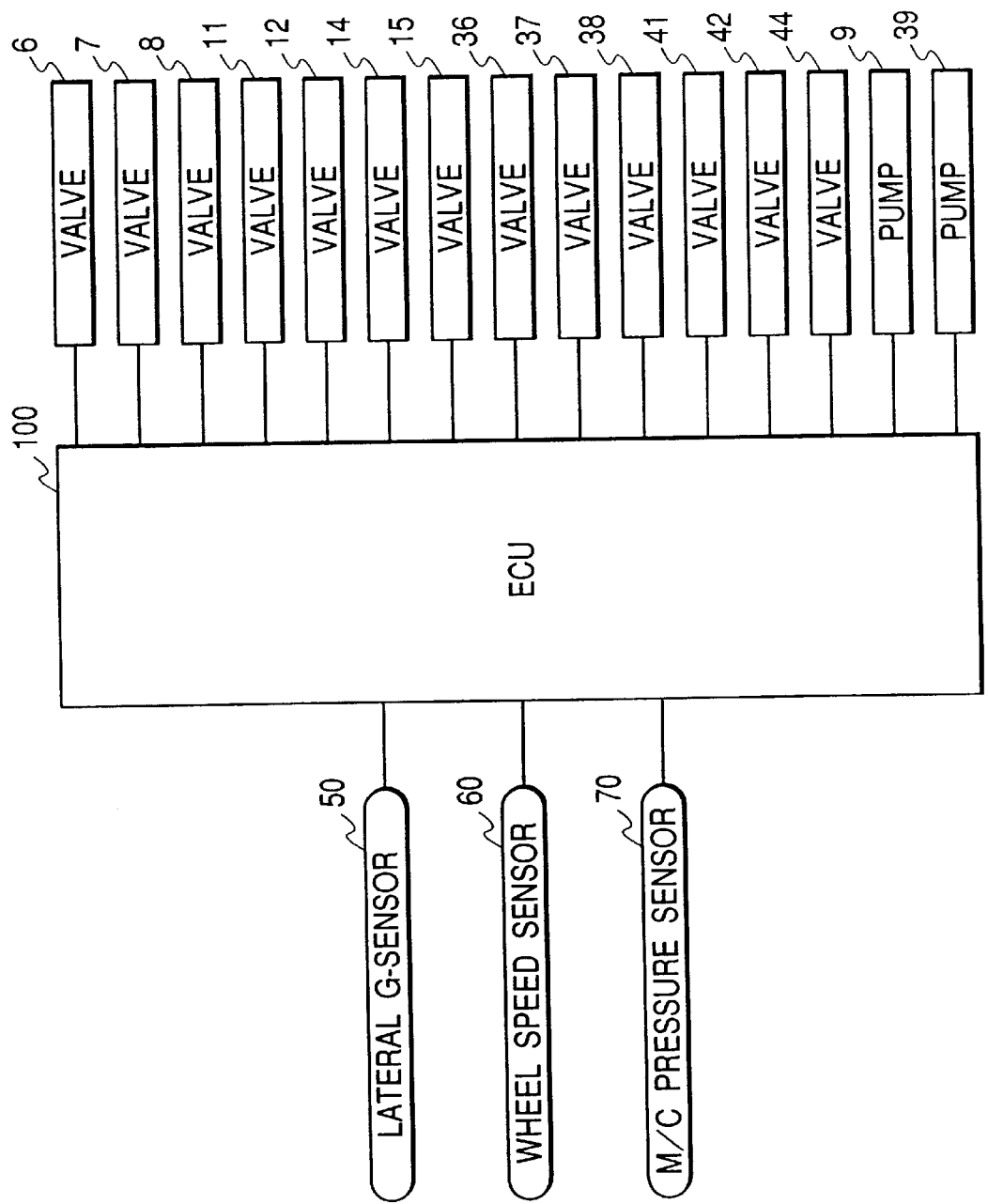
FIG. 2 is a block diagram which shows a vehicle behavior control apparatus of the invention.

The above described valves installed in the first and second hydraulic lines A and E are, as shown in FIG. 2, electrically controlled by an electronic control unit (ECU) 100. The ECU 100 consists essentially of a ROM, a RAM, an I/O interface, etc. and receives outputs of a lateral acceleration sensor 50, wheel speed sensors 60, and an M/C (master cylinder) pressure sensor 70 to provide control signals to the actuators or valves in the first and second hydraulic lines A and E. The lateral acceleration sensor 50 may be designed to measure the lateral acceleration acting on the vehicle body directly or alternatively implemented with a yaw rate sensor which measures the yaw rate of angular motion applied to the vehicle body. The wheel speed sensors 60 are provided, one for each of the front right and left wheels FR and FL and the rear right and left wheels RR and RL, and may be of an electromagnetic pickup type which outputs an electric signal as a function of speed of the wheel. The M/C pressure sensor 70 is, as shown in FIG. 1, disposed in a hydraulic line H between the master cylinder 2 and the control valve 44 and measures the pressure in the master cylinder 2.

The automotive brake control apparatus thus constructed has the following effects.

The fluid pressure difference regulating unit 500 is, as described above, designed to hold the pressure difference between the first and second hydraulic lines A and E below a predetermined threshold level. Therefore, even when there is the above discussed mechanical or electrical performance difference between the first and second hydraulic lines A and E, the fluid pressure difference regulating unit 500 operates to absorb an unwanted increase in pressure difference between the hydraulic lines A and E above the threshold level by the movement of the piston 503, thereby preventing an undesirable difference in pressure between the wheel cylinders 4 and 5 in the first hydraulic line A and the wheel cylinders 34 and 35 in the second hydraulic line B from occurring. The piston 503 is, as already described, in liquid-tight engagement with the inner wall of the casing so that the first and second hydraulic lines A and E are isolated fluidly from each other. Thus, even if a leakage of the brake fluid takes place in either of the first and second hydraulic lines A and B, it is possible to elevate the wheel cylinder pressure in the other hydraulic line. This is advantageous to the fail-safe operation.

If one of the first and second hydraulic lines A and E is broken, there is a possibility that the piston 503 is moved fully to the broken one, thereby consuming the brake fluid used in elevating the wheel cylinder pressure in the other. It is, thus, advisable that the volume of the pressure chamber 502 be determined based on the volumes of the primary and secondary chambers 2A and 2B of the master cylinder 2 and a minimum amount of brake fluid required to increase the wheel cylinder pressure up to a level enough for the braking as well as the above discussed mechanical and electrical performance differences between the first and second hydraulic lines A and E except insofar as if the first hydraulic line A is broken, the pump 9 is operated, and the control valve 14 is opened to allow the brake fluid to be sucked from the master reservoir 3 actively.

The connecting line 501 is located closer to the differential pressure control valves 6 and 36 in the first and second hydraulic lines A and B than the pressure elevation control valves 7, 8, 37, and 38 working as brake pressure control actuators employed in the anti-skid brake control. The operation of the fluid pressure difference regulating unit 500, therefore, does not interfere another control such as the anti-skid brake control or the turning trace control. For instance, even when it is required to reduce or hold the pressure in one of the wheel cylinders 4, 5, 34, and 35 during the anti-skid brake control, it may be achieved accurately by closing the pressure elevation control valves 7, 8, 37, and 38 and opening the pressure reduction control valves 11, 12, 41, and 42. The fluid pressure difference regulating unit 500 may be operated without sacrificing the anti-skid brake control, the turning trace control, and a combination of the anti-skid brake control and the brake assisting control.

The automotive brake control apparatus of this embodiment is designed to perform not only the brake assisting function, but also the function of regulating the wheel cylinder pressure used in the vehicle behavior control, the anti-skid brake control., and the traction control. In other words, the automotive brake control apparatus is designed to allow the wheel cylinder pressure to be regulated both when the driver of the vehicle depresses the brake pedal 1 to develop the master cylinder pressure and when no master cylinder pressure is developed. The control valve 14 in the first hydraulic line A is usually closed when no master cylinder pressure is produced and opened upon control of the wheel cylinder pressure when the master cylinder pressure is produced. Therefore, when the master cylinder pressure is not produced and when it is required to control the wheel cylinder pressure, the pump 9 sucks the brake fluid from the master reservoir 3 through the check valve 15. Subsequently, when the vehicle driver depresses the brake pedal 1 to develop the pressure in the master cylinder 2, the control valve in the first hydraulic line A is opened to elevate the pressure in a junction of the branch lines D1 and D2 up to a level higher than that in a portion of the branch line D1 upstream of the check valve 15, so that most of the brake fluid sucked into the pump 9 is supplied from the primary chamber 2A of the master cylinder 2. On the check valve 15 in the branch line D2 which is substantially opened to the atmosphere, the pressure of the brake fluid produced in the master cylinder 2 acts to inhibit the suction of the brake fluid from the master reservoir 3 to the pump 9. Therefore, the use of the check valve 15 in the branch line D2 enables the suction of the brake fluid into the pump 9 to be switched automatically from the master reservoir 3 to the master cylinder 2 upon generation of the master cylinder pressure. This eliminates the need of determination of whether the vehicle driver has depressed the brake pedal 1 to develop the pressure in the master cylinder 2 or not for regulating the wheel cylinder pressure in the vehicle behavior control and use of results of determination of braking conditions in the wheel cylinder pressure control, or the fail-safe system when the results of determination of braking conditions are employed in the wheel cylinder pressure control. Specifically, it eliminates the need of detection of wire breakage of a STP (stop lamp) switch and the master cylinder pressure sensor 70 employed in determining braking conditions. The same is true for the check valve 151 in the second hydraulic line E.

Usually, the traction control and the turning trace control in the vehicle behavior control system requires quick elevation in wheel cylinder pressure even when the vehicle driver does not depress the brake pedal. The elevation in wheel cylinder pressure is achieved by a self-priming pump. For this, a differential pressure control valve which holds a pressure difference between master cylinder and wheel cylinder sides of a hydraulic line is disposed closer to a master cylinder than pressure elevation and pressure reduction valves working as actuators mainly for the anti-skid control. Additionally, in order to increase the wheel cylinder pressure when the brake pedal is not depressed or perform the brake assisting function, the pump sucks the brake fluid from the master cylinder and discharges it to a portion of the hydraulic line on the wheel cylinder side of the differential pressure control valve. The hydraulic line between the master cylinder and the master reservoir is, however, small in inner diameter, which results in a great flow resistance to the flow of the brake fluid sucked by the pump from the mater reservoir through the master cylinder, thereby making it difficult to increase the wheel cylinder pressure quickly using the pump. In order to avoid this problem, a system is known in which a bypass line is arranged between an inlet of the pump and the master reservoir, and a normally closed two-position valve is disposed in the bypass line. Systems designed to suck the brake fluid only from the master cylinder using a pump have the following disadvantages. The amount of brake fluid flowing from the master cylinder to the wheel cylinders through the pump during the vehicle behavior control is the sum of the amount of brake fluid existing in the hydraulic line between the master cylinder to the wheel cylinders before the vehicle behavior control and an additional amount of brake fluid required to the vehicle behavior control. Thus, a return of the additional amount of brake fluid to the master cylinder upon completion of the vehicle behavior control may produce an excessive brake pressure acting on seals installed in the master cylinder, thereby resulting in deterioration of the seals. In a case where the inlet of the pump connects with the master cylinder only through a single line, when the brake pedal is not depressed so that no master cylinder pressure is produced, a high flow resistance arises to suction of the brake fluid from the master cylinder by the pump, thereby decreasing the rate of elevation in wheel cylinder pressure. This is because the inner diameter of the line connecting the master cylinder and the wheel cylinders is very small. For the reasons sated above, typical brake systems designed to perform the vehicle behavior control have two hydraulic lines: one being used to suck the brake fluid from the master reservoir through the master cylinder and the second connecting the master reservoir and the wheel cylinders bypassing the master cylinder to suck the brake fluid directly from the master reservoir. The brake systems also have a two-position control valve which is disposed in the second hydraulic line and which is electrically opened to allow the pump to suck the brake fluid from the master reservoir when the brake pedal is depressed to elevate the wheel cylinder pressure above the master cylinder pressure. The two-position control valve, however, needs to be kept energized for a period of time in which the pump sucks the brake fluid from the master reservoir, thus requiring improvement on durability of component parts of the control valve such as a coil. The control of the control valve also results in an increase in load of an ECU (electronic control unit).

In order to avoid the above problems, the hydraulic system of this embodiment, as described above, has the check valves 15 and 151 which are disposed in the branch lines D2 and H2 and which allow the brake fluid to flow from the master reservoir 3 to the inlets of the pumps 9 and 33 when the brake pedal 1 is not depressed and avoid the backflow of the brake fluid to the master reservoir 3 through the branch lines D2 and H2 when the brake pedal 1 is depressed to activate the pumps 9 and 39 to suck the brake fluid from the master reservoir 3 through the master cylinder 2, respectively. The use of the check valves 15 and 151 eliminates the need for the two-position control valve and avoids the increase in load of the ECU 100.

Figure 3:
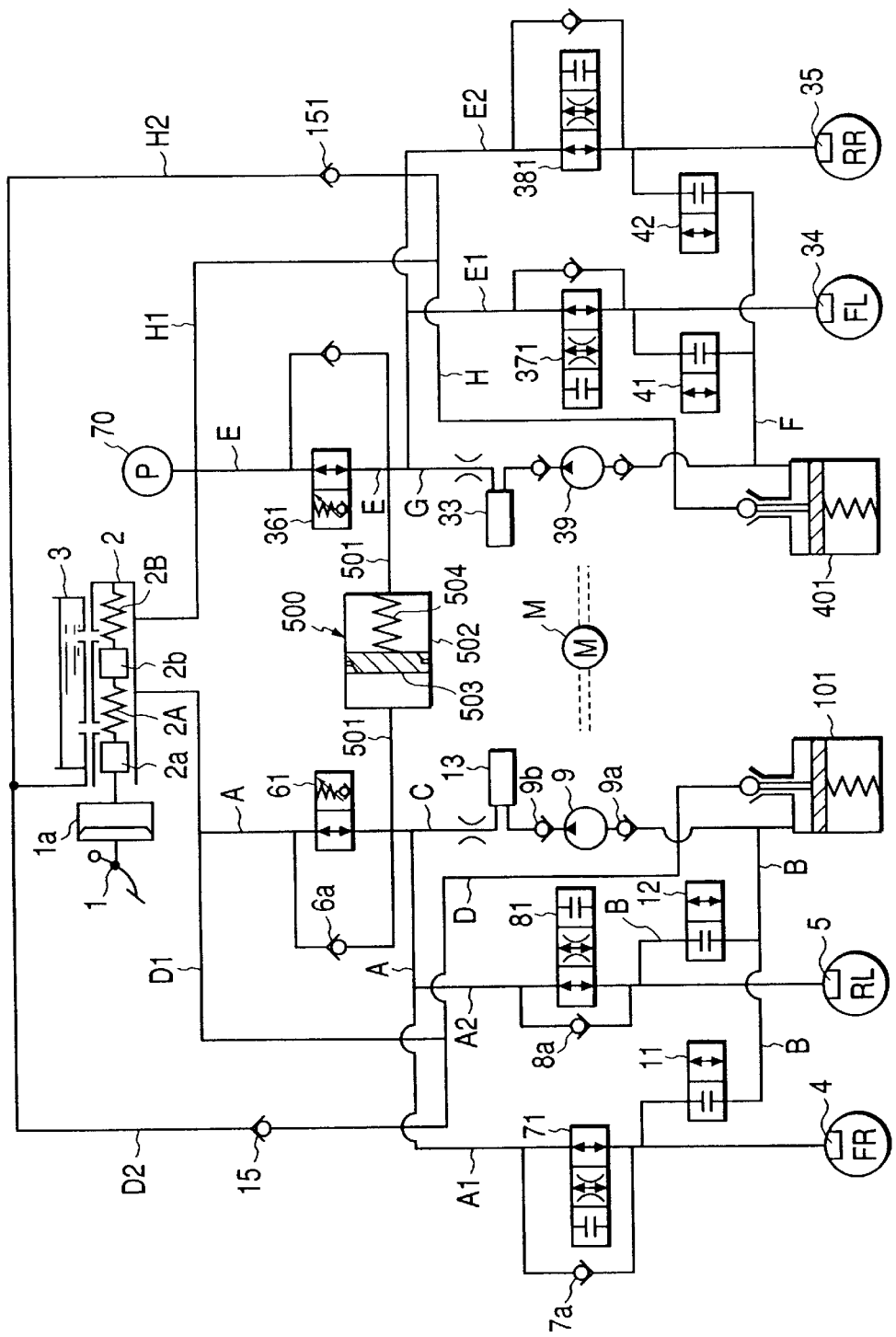
FIG. 3 is a hydraulic circuit diagram which shows a hydraulic system of a brake control apparatus according to the second embodiment of the invention.

FIG. 3 shows a hydraulic system of an automotive brake control apparatus according to the second embodiment of the present invention. The same reference numbers as employed in FIG. 1 refer to the same parts, and explanation thereof in detail will be omitted here.

The hydraulic system of this embodiment uses linear differential pressure control valves 61 and 361 and three-port pressure elevation control valves 71, 81, 371, and 381 instead of the control valves 6 and 36 and the pressure elevation control valves 7, 8, 37, and 38 used in the first embodiment, respectively. The linear differential pressure control valves 61 and 361 and the three-port pressure elevation control valves 71, 81, 371, and 381 are not energized during normal braking so that they are opened in illustrated positions, respectively. Each of the three-port pressure elevation control valves 71, 81, 371, and 381 also have second opened positions in which the brake fluid is forced to pass through a smaller opening. Specifically, when it is required to elevate the wheel cylinder pressure gradually, the three-port pressure elevation control valves 71, 81, 371, and 381 are kept in the second opened positions, while when it is required to elevate the wheel cylinder pressure quickly, they are kept in the first opened positions (i.e., the illustrated positions). Further, when it is required to hold or reduce the wheel cylinder pressure during control of the wheel cylinder pressure, the three-port pressure elevation control valves 71, 81, 371, and 381 are closed.

Each of the linear differential pressure control valves 61 and 361 has two positions: one being a fully opened position and the second being a linear pressure difference producing position. In the linear pressure difference producing position, the amount of lift of a needle valve installed in each of the linear differential pressure control valves 61 and 361 is controlled as a function of a supplied amount of electric current to regulate the flow rate of the brake fluid from the branch lines A1, A2, E1, and E2 to the master cylinder 2. Therefore, when the linear differential pressure control valves 61 and 361 are in the linear pressure difference producing position, the pressure of the brake fluid on the wheel cylinder side is held higher than the master cylinder pressure as a function of the amount of current supplied to the linear differential pressure control valves 61 and 361.

The hydraulic system also includes switch reservoirs 101 and 401 each of which includes a switching mechanism and a reservoir chamber. The switch reservoirs 101 and 401 connect through the switching mechanisms with the branch lines D and H and through the reservoir chambers with the inputs of the pumps 9 and 39 and the pressure reduction control valves 11, 12, 41, and 42, respectively. The switching mechanisms, as clearly shown in the drawing, consist of a check valve assembly. The check valve assembly includes a ball and a piston. The piston has a shaft connecting with the ball and a piston head or disc defining the reservoir chamber. The switching mechanisms block fluid communications between the inlets of the pumps 9 and 39 and the branch lines D and H, respectively, when the volume of brake fluid in the reservoir chambers is greater than a preselected value and establish the fluid communications when the volume of brake fluid in the reservoir chambers is smaller than the preselected level, for example, when the amount of brake fluid equivalent to an actual pressure reduction is not in the reservoir chambers for allowing the pumps 9 and 39 to suck the brake fluid directly from the master reservoir 3 or from the master reservoir 3 through the primary chamber 2A and the secondary chamber 2B of the master cylinder 2.

The reservoir chambers of the switch reservoirs 101 and 401 have the capacity enough to store the quantity of brake fluid equivalent to a required pressure reduction in the wheel cylinders 4, 5, 34, and 35 during the anti-skid brake control and serve to avoid direct transmission of the pressure elevated in the master cylinder 2 to the pumps 9 and 39 for minimizing damage to the inlets thereof. This is achieved by operations, as discussed below. When the pressure in the master cylinder 2 is elevated, the brake fluid in the master cylinder 2 flows into the reservoir chambers of the switch reservoirs 101 and 401 through the switching mechanisms until the volume of the reservoir chambers is increased up to the preselected value. When the pumps 9 and 39 are operated, they suck the brake fluid from the reservoir chambers of the switch reservoirs 101 and 401, respectively, so that the volume of the reservoir chambers is decreased to establish the fluid communications between the reservoir chambers and the branch lines D and H again. In other words, the suction of the brake fluid to the pumps 9 and 39 is performed either when the pistons of the switching reservoirs 101 and 401 move downward, as viewed in the drawing, to increase the volume of the reservoir chambers or when the fluid communications between the reservoir chambers and the master cylinder 2 are blocked, there by avoiding the direct transmission of the pressure in the master cylinder 2 to the inlets of the pumps 9 and 39.

The three-port pressure elevation control valves 71, 81, 371 and 338 may be replaced with two-port valves such as the valves 7, 8, 41, and 42 in FIG. 1.

Figure 4:
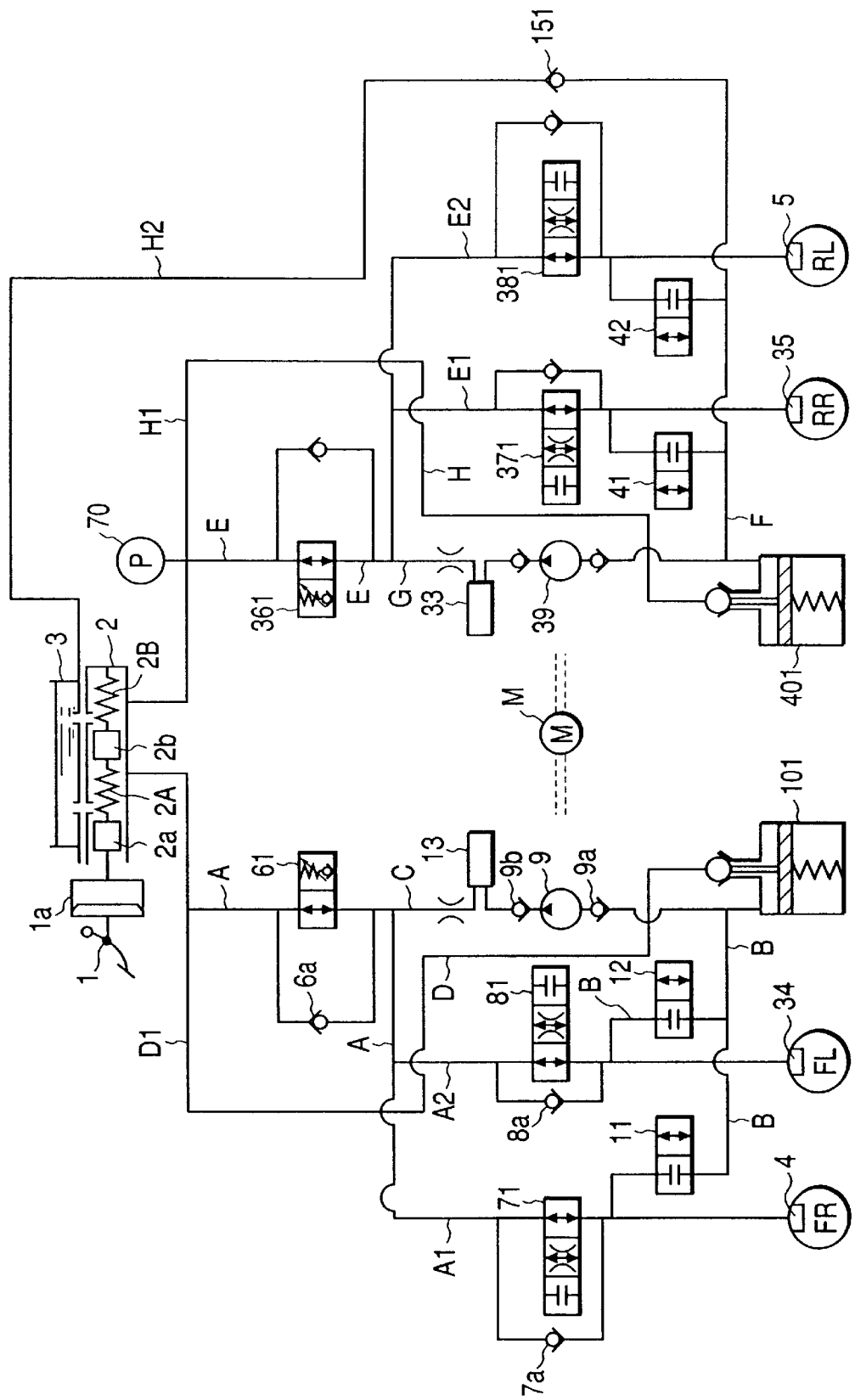
FIG. 4 is a hydraulic circuit diagram which shows a hydraulic system of a brake control apparatus according to the third embodiment of the invention.

FIG. 4 shows a hydraulic system of an automotive brake control apparatus according to the third embodiment of the present invention. The same reference numbers as employed in FIG. 3 refer to the same parts, and explanation thereof in detail will be omitted here.

The hydraulic system, unlike the first and second embodiments, has front and rear wheel hydraulic lines A and H. The front wheel hydraulic line A connects with the wheel cylinders 4 and 34 for the front right and front left wheels, while the second hydraulic line E connects with the wheel cylinders 35 and 5 for the rear right and rear left wheels. The brake control apparatus of this embodiment is suitable for the traction control in rear-wheel drive vehicles.

The front hydraulic line A does not have the branch line D2 as used in the first and second embodiments and connect the master cylinder 2 and the switch reservoir 101 only through the branch line D1. The branch line H2 of the rear wheel hydraulic line H is isolated from the branch line H1 and connects the master reservoir 3 and the reservoir chamber of the switch reservoir 401 through the branch line F. The branch line F is used to reduce the pressure in the wheel cylinders 34 and 35 during the anti-skid brake control. The branch line H2 allows the brake fluid to flow from the master reservoir 3 directly to the inlet of the pump 39 without passing through the switch reservoir 401, thus resulting in a decrease in flow resistance of the brake fluid sucked into the pump 39 during the traction control as compared with the first and second embodiments. This allows the brake fluid to flow from the master cylinder 2 to the wheel cylinders 4, 5, 34, and 35 through the branch line H2 at a rate higher than that in the second embodiment when the pressure in the master cylinder 2 is elevated.

Figure 5:
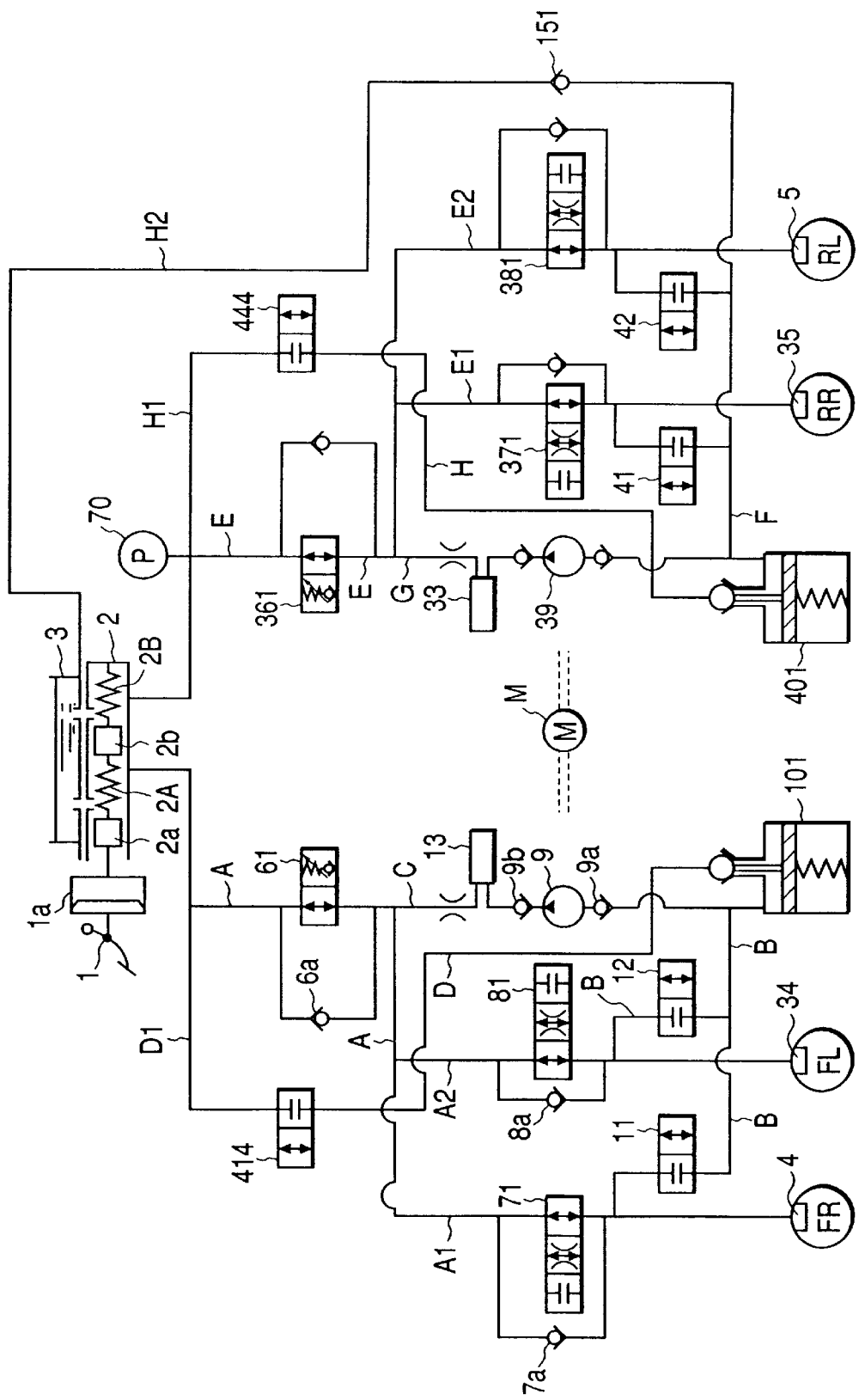
FIG. 5 is a hydraulic circuit diagram which shows a hydraulic system of a brake control apparatus according to the fourth embodiment of the invention.

FIG. 5 shows a hydraulic system of an automotive brake control apparatus according to the fourth embodiment of the invention which is different from the third embodiment only in that control valves 414 and 444 are disposed between the master cylinder 2 and the switch reservoirs 101 and 401 in the branch lines D1 and H1, respectively. Other arrangements are identical, and explanation thereof in detail will be omitted here.

The control valves 414 and 444 are identical in structure with the control valves 14 and 44 in FIG. 1, but closed during normal braking and opened when a brake assisting operation is initiated. Specifically, the control valves 414 and 444 work to hold the brake fluid in the master cylinder 2 from flowing into the switch reservoirs 101 and 401 when the brake pedal 1 is depressed to elevate the pressure in the master cylinder 2 for preventing a stroke of the brake pedal 1 from lengthening undesirably by an amount equivalent to the amount of brake fluid entering the reservoir chambers of the switch reservoirs 101 and 401.

Figure 6:
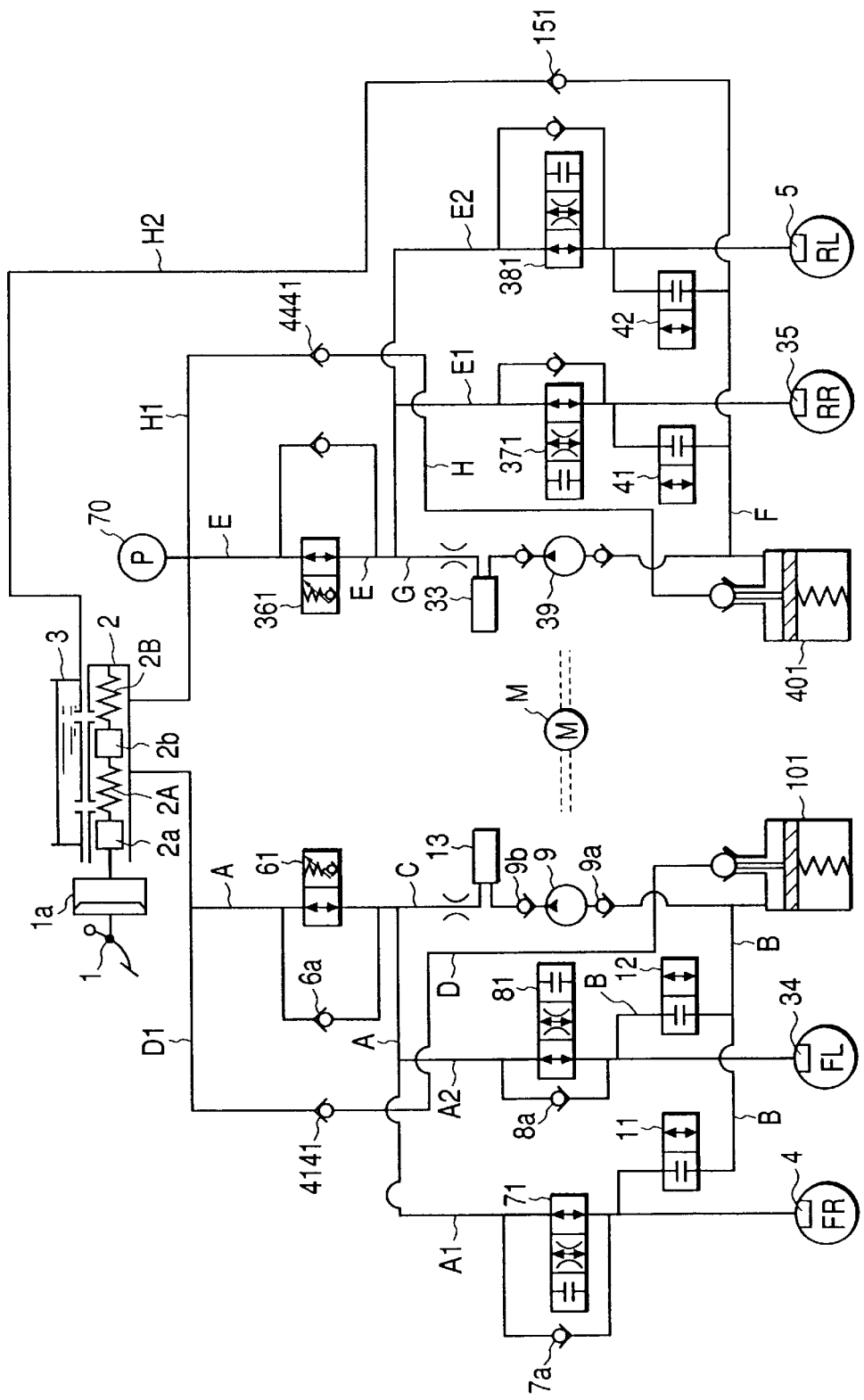
FIG. 6 is a hydraulic circuit diagram which shows a hydraulic system of a brake control apparatus according to the fifth embodiment of the invention.

FIG. 6 shows a hydraulic system of an automotive brake control apparatus according to the fifth embodiment of the invention which is different from the fourth embodiment only in that check valves 4141 and 4441 are installed in the branch lines D1 and H1 instead of the control valves 414 and 444. Other arrangements are identical, and explanation thereof in detail will be omitted here.

The check valves 414 and 444 allow the brake fluid to flow from the master cylinder 2 to the inlets of the pumps 9 and 39 and avoid the backflow to the master cylinder 2. Thus, when the brake pedal 1 is depressed for the first time after completion of the anti-skid brake control or the brake assisting operation using the switch reservoirs 101 and 401, an excessive stroke of the brake pedal 1 is required until the ball of each of the switch reservoirs 101 and 401 reaches the valve seat, that is, the volume of the reservoir chamber reaches the preselected value, but not required subsequently until the anti-skid brake control or the brake assisting operation is performed again.

The third to fifth embodiments as shown in FIGS. 4 to 6 may be used in a diagonal hydraulic system such as the ones in the first and second embodiments including the hydraulic line A connecting with the wheel cylinders 4 and 5 for the front right and rear left wheels and the hydraulic line E connecting with the wheel cylinders 34 and 35 for the front left and rear right wheels. In this case, the branch lines D2 and H2, the check valves 15 and 151, and the fluid pressure difference regulating unit 500 are arranged as shown in FIGS. 1 and 3.

Figure 7:
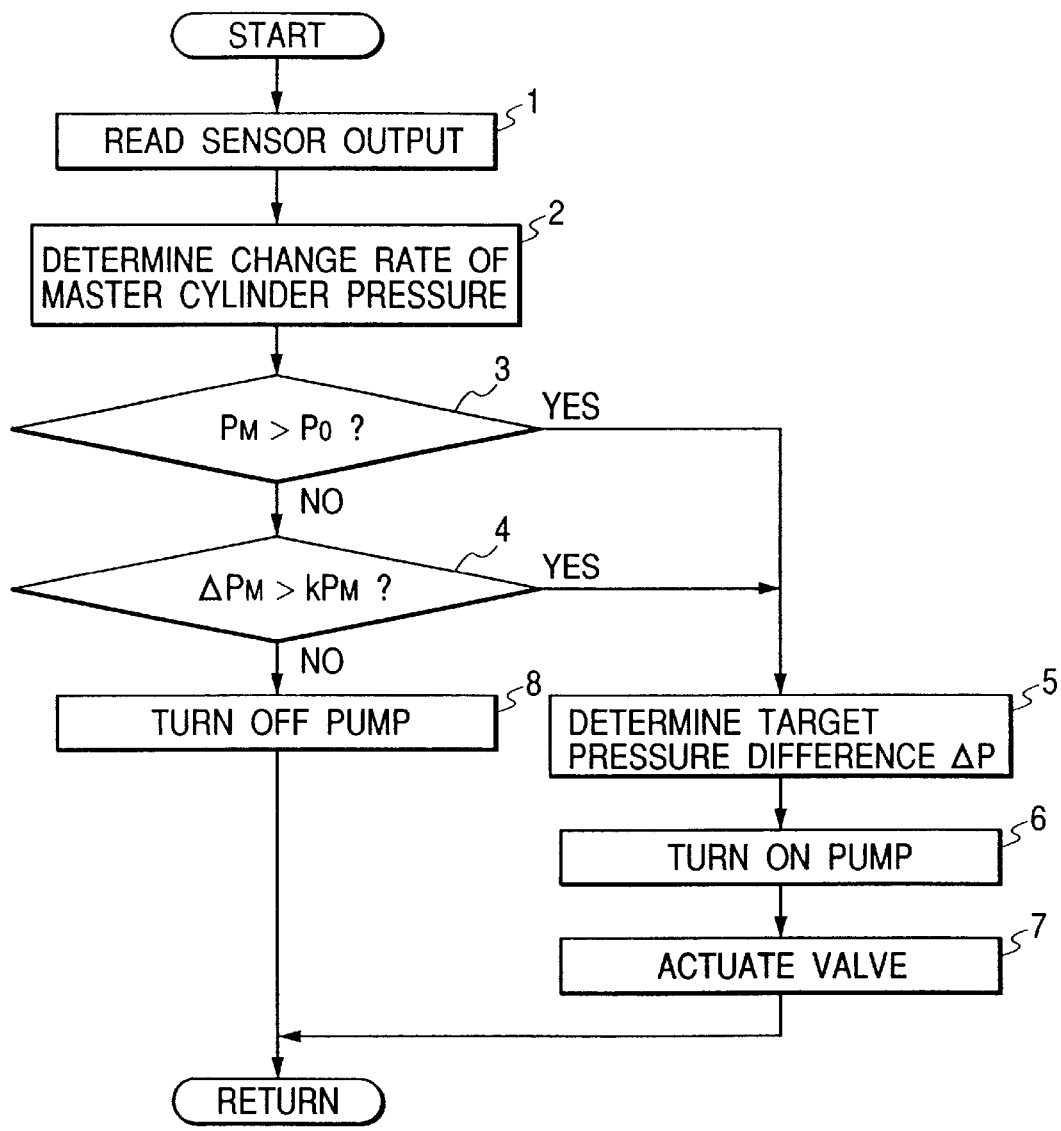
FIG. 7 is a flowchart of a brake assisting program executed in the first to sixth embodiments.

FIG. 7 shows a flowchart of a brake assisting program executed by the ECU 100 in the first to sixth embodiments as discussed above.

After entering the program, the routine proceeds to step 1 wherein the ECU 100 receives outputs from the master cylinder pressure sensor 70 and the wheel speed sensors 60 to determine the pressure PM in the master cylinder 2 and the speed of each wheel.

The routine proceeds to step 2 wherein a change in master cylinder pressure PM per unit time, i.e., the rate of change ΔPM in master cylinder pressure PM is determined.

The routine proceeds to step 3 wherein it is determined whether the master cylinder pressure PM is greater than a preselected level P0 or not, that is, whether the brake pedal 1 is depressed by the vehicle driver or not. An additional step may alternatively be executed before step 3 to determine the speed of the vehicle body is higher than a predetermined speed or not. If a YES answer is obtained, then the routine proceeds to step 3.

If a YES answer is obtained in step 3, then the routine proceeds to step 5. Alternatively, if a NO answer is obtained, then the routine proceeds to step 4.

In step 4, it is determined whether the rate of change ΔPM determined in step 2 is greater than a given value KPM or not. If a NO answer is obtained, then the routine proceeds to step 8 wherein the motor M is turned off to stop the pumps 9 and 39, and all the valves in the hydraulic system are turned off to establish the valve positions, as illustrated in the drawings, in the normal braking mode of operation.

Figure 8:
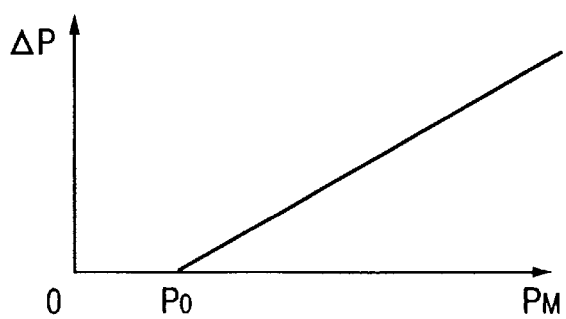
FIG. 8 is a map showing the relation between a target pressure difference ΔP between the master cylinder pressure and the wheel cylinder pressure and the master cylinder pressure PM.

In step 5, a target pressure difference ΔP between the master cylinder pressure PM and the wheel cylinder pressure is determined by look-up using a map as shown in FIG. 8. Specifically, the target pressure difference ΔP is increased linearly in a range in which the master cylinder pressure PM is greater than the preselected level P0.

The routine proceeds to step 6 wherein the pumps 9 and 39 are turned on. The routine proceeds to step 7 wherein, in the second embodiment for example, the linear differential pressure control valves 61 and 361 are deenergized to have the pressure difference between the master cylinder pressure and the wheel cylinder pressure reach the target pressure difference ΔP determined in step 5.

If the slip ratio of any of the wheels exceeds a given threshold value during the above brake assisting operation, the anti-skid brake control may be performed to reduce and hold the pressure in the corresponding wheel cylinders.

Figure 9:
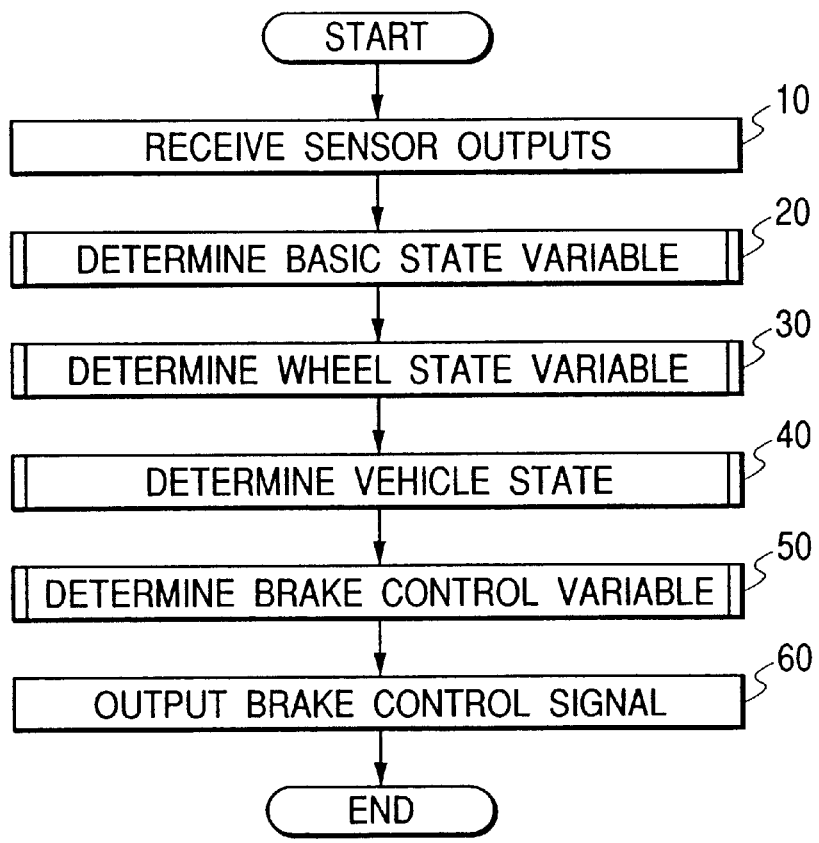
FIG. 9 is a flowchart of a main program executed to control the behavior of a vehicle.

FIG. 9 shows a flowchart of a program or sequence of logical steps performed by the ECU 100 to control the vehicle behavior. This program may be used with any of the first to fifth embodiments, but discussion below will refer to the second embodiment shown in FIG. 3 for the simplicity of explanation.

Upon turning on of an ignition switch (not shown) of the vehicle, the program is entered, and the routine proceeds to step 10 wherein the ECU 100 receives outputs of the lateral acceleration sensor 50 and the wheel speed sensors 60.

Figure 10:
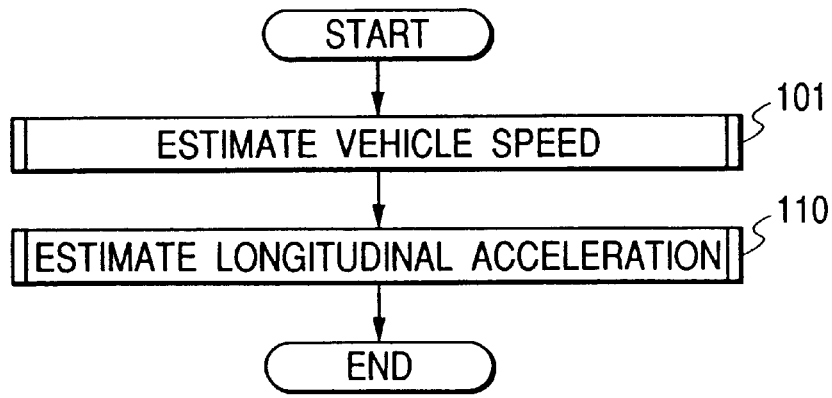
FIG. 10 is a flowchart of a sub-program executed in step 20 of FIG. 9 to determine basic state variables.

The routine proceeds to step 20 to determine basic state variables according to a sub-program shown in FIG. 10.

Figure 13:
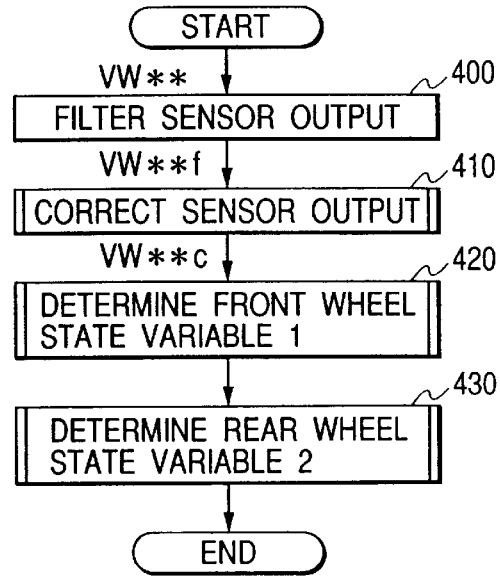
FIG. 13 is a flowchart of a sub-program executed in step 30 of FIG. 9 to determine front and rear wheel state variables.

The routine proceeds to step 30 to determine wheel state variables according to a sub-program shown in FIG. 13.

Figure 16:
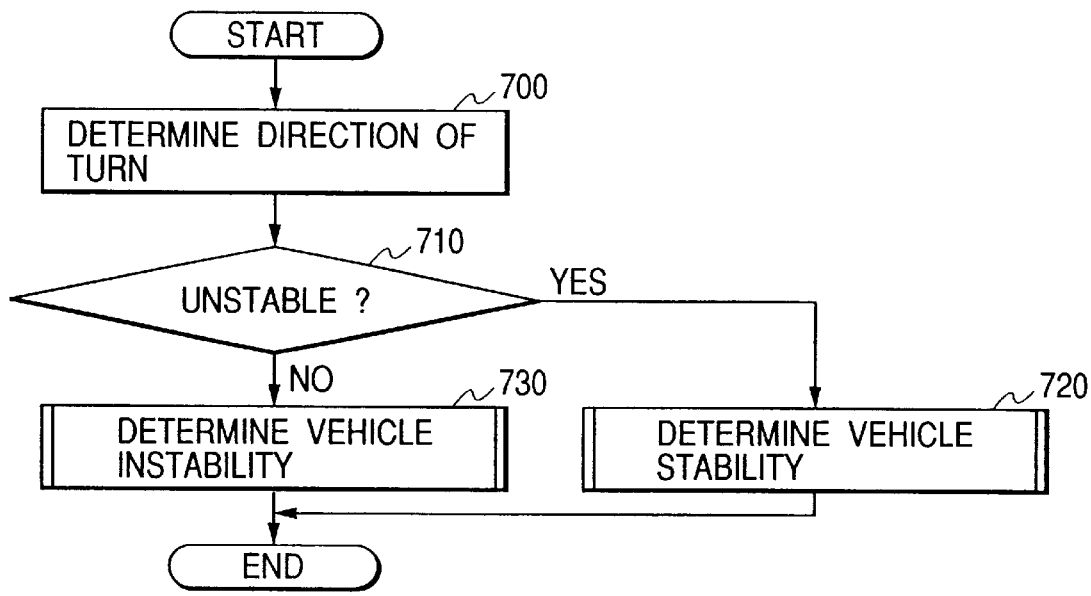
FIG. 16 is a flowchart of a sub-program executed in step 40 of FIG. 9 to determine the state of a vehicle.

The routine proceeds to step 40 to determine a vehicle state for estimating stability of the vehicle body according to a sub-program shown in FIG. 16.

Figure 22:
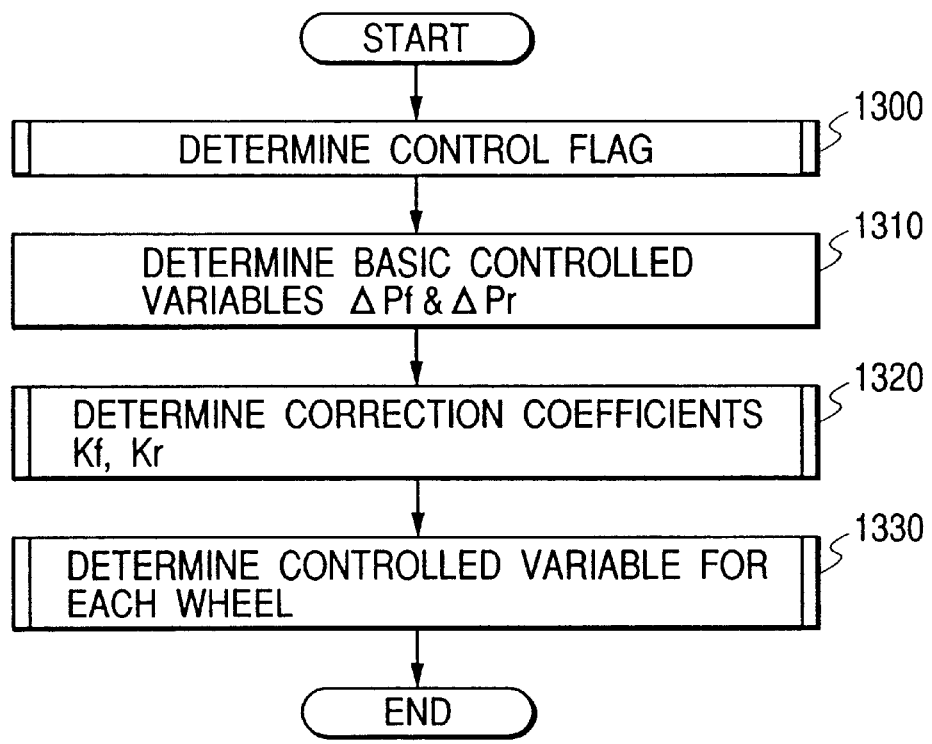
FIG. 22 is a flowchart of a sub-program executed in step 50 of FIG. 9 to determine a controlled variable for each wheel.

The routine proceeds to step 50 to determine a controlled variable for each wheel (i.e., the wheel cylinder pressure applied as the braking effort to each wheel) according to a sub-program shown in FIG. 22.

Figure 27:
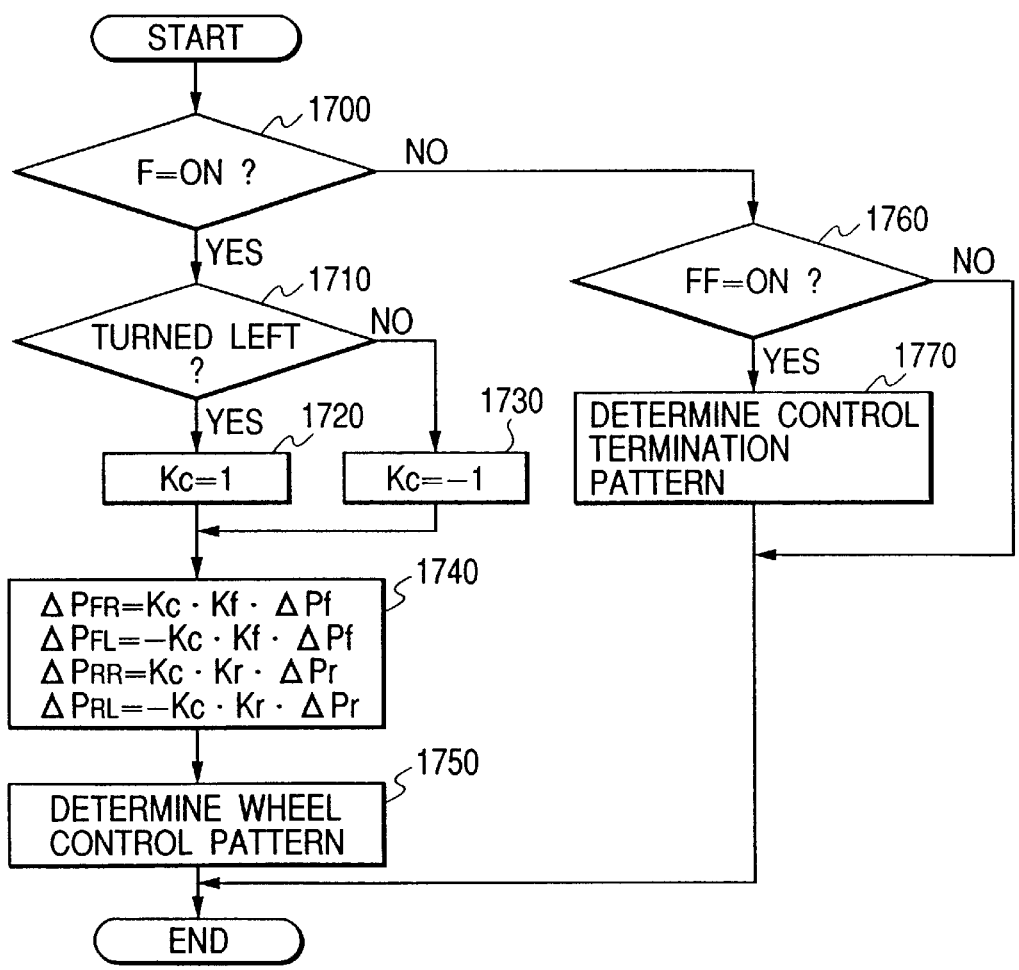
FIG. 27 is a flowchart of a sub-program executed in step 1330 of FIG. 22 to determine a controlled variable for each wheel.
Figure 28:
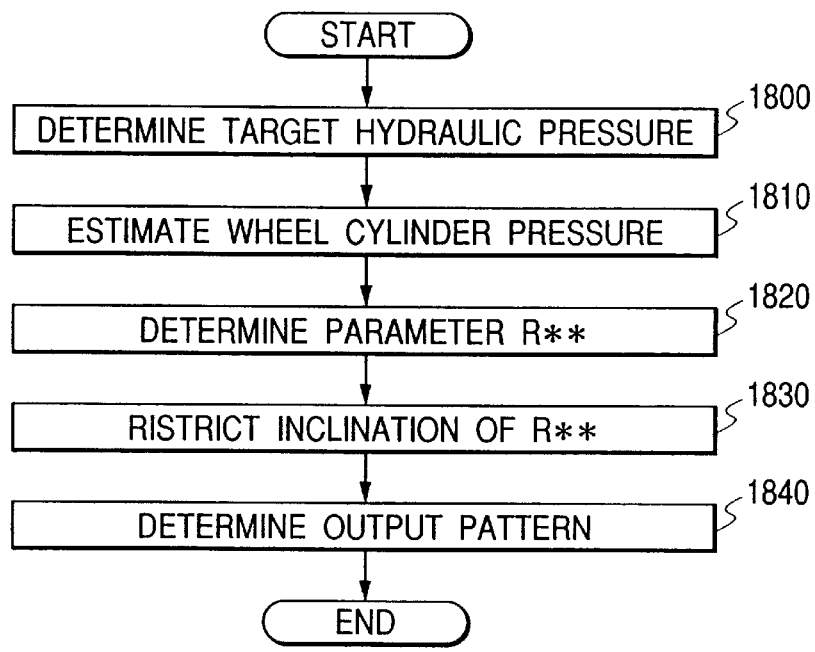
FIG. 28 is a flowchart of a sub-program executed in step 1750 of FIG. 27 to determine a control pattern for each wheel.

The routine proceeds to step 60 to output brake control signals (i.e., control signals for the valves in the first and second hydraulic lines A and E) according to a sub-program shown in FIGS. 27 and 28.

Referring to FIG. 10, in step 101, the speed of the vehicle body is estimated. This estimation is achieved using outputs of the wheel speed sensors 60. For instance, the second greatest of the wheel speeds or a maximum wheel speed may be determined as the vehicle body speed using the known algorithm. In a case where a longitudinal acceleration sensor is installed in the vehicle, the vehicle body speed may be determined by integrating the longitudinal acceleration acting on the vehicle body. Alternatively, the vehicle body speed may be determined using a sensor capable of measuring an absolute speed of the vehicle body. This embodiment estimates the vehicle body speed according to a sub-program shown in FIG. 11.

After the vehicle body speed is estimated, the routine proceeds to step 110 wherein the longitudinal acceleration acting on the vehicle body is estimated. This estimation may be achieved by using outputs of the wheel speed sensors 60 or alternatively using an output of the longitudinal acceleration sensor.

Figure 11:
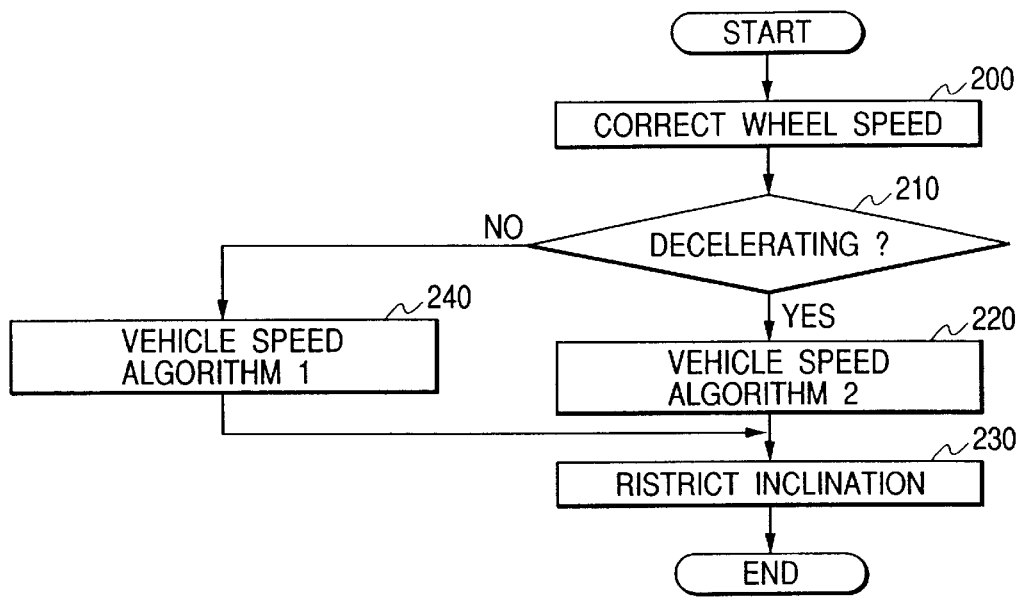
FIG. 11 is a flowchart of a sub-program executed in step 101 of FIG. 10 to estimate the speed of a vehicle body.

Referring to FIG. 11, in step 200, the speed of each wheel is corrected. Specifically, an output of each of the wheel speed sensors 60 is corrected based on the position of the center of gravity of the vehicle body according to one of equations below.

$$VW_{FR}forVX=VW_{FR}-Lf \times YR \tag{1}$$

$$VW_{FL}forVX=VW_{FL}-Lf \times YR \tag{2}$$

$$VW_{RR}forVX=VW_{RR}-Lr \times YR \tag{3}$$

$$VW_{RL}forVX=VW_{RL}-Lr \times YR \tag{4}$$

where $VW_{FR}forVX$, $VW_{FL}forVX$, $VW_{RR}forVX$, and $VW_{RL}forVX$ are corrected speeds of the front right, front left, rear right, and rear left wheels, respectively, $VW_{FR}$, $VW_{FL}$, $VW_{RR}$, and $VW_{RL}$ are speeds of the front right, front left, rear right, and rear left wheels as determined by outputs of the wheel speed sensors 60, respectively, Lf is the shortest distance between the center of gravity of the vehicle and a front axle, Lr is the shortest distance between the center of gravity of the vehicle and a rear axle, and YR is the yaw rate. In a case where the lateral acceleration sensor 50 is designed to measure the lateral acceleration acting on the vehicle body and not the yaw rate, the yaw rate YR may be given by an equation below.

$$YR=GY/V(n-1) \tag{5}$$

where GY is the lateral acceleration, n is the number of operations (i.e., program execution cycles), and V(n−1) is the speed of the vehicle body estimated one program execution cycle earlier. The speed of the vehicle body V(n) estimated in this program execution cycle will be referred to as VX below. When the vehicle is traveling at an extremely low speed (e.g., less than 5 km/s that is a lower critical value of resolution of the wheel speed sensors 60), a constant value (e.g., 5 km/s) is substituted into V(n−1).

The routine proceeds to step 210 wherein it is determined whether the vehicle is decelerating or not. The positive answer is obtained if at least one of four conditions below is encountered. The first is that the value of longitudinal acceleration acting on the vehicle body determined by an output of the sensor 50 or estimated mathematically is negative. The second is that a stop lamp switch (not shown) is turned on, which indicates that the brake pedal 1 is substantially pressed by the vehicle operator. The third is that an IDL (idle) switch is turned on. The fourth is that the master cylinder pressure indicated by an output of the M/C pressure sensor 70 is higher than a preselected value which produces a braking effort.

If a YES answer is obtained in step 210 meaning that the vehicle is now decelerating, then the routine proceeds to step 220 wherein the speed of the vehicle body is estimated according to the second algorithm. Alternatively, if a NO answer is obtained in step 210, then the routine proceeds to step 240 wherein the speed of the vehicle body is estimated according to the first algorithm. In the first algorithm, the smallest of speeds of the four wheels is determined as the speed of the vehicle body. In the second algorithm, the greatest of speeds of the four wheels is determined as the speed of the vehicle body. The reason that the first and second algorithms are used selectively depending upon the deceleration of the vehicle is because when the vehicle is decelerating, it may send any of the wheels into brake-caused skids so that the speeds of the skidding wheels become much smaller than the speed of the vehicle body, and conversely, when the vehicle is not decelerating, but accelerating, it may send any of the wheels into acceleration-caused skids so that the speeds of the skidding wheels become much greater than the speed of the vehicle body.

After step 220 or 240, the routine proceeds to step 230 wherein the rate of change in estimated vehicle body speed is limited. Specifically, a change of the estimated vehicle body speeds between a previous program execution cycle and this program execution cycle is restricted depending upon the longitudinal acceleration acting on the vehicle body.

Figure 12:
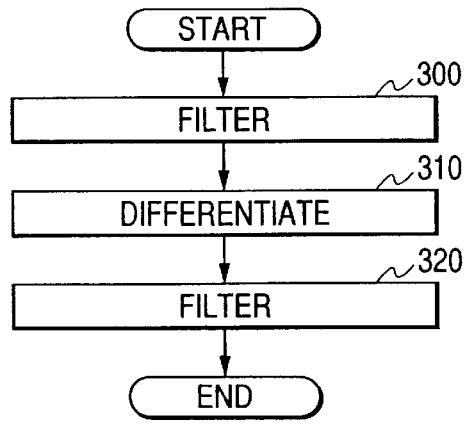
FIG. 12 is a flowchart of a sub-program executed in step 110 of FIG. 10 to estimate the longitudinal acceleration acting on a vehicle body.

FIG. 12 shows a sub-program executed in step 110 of FIG. 10 to estimate the longitudinal acceleration acting on the vehicle body.

In step 300, the vehicle body speed estimated in a manner as discussed in FIG. 11 is filtered using, for example, a low-pass filter to remove noise components higher in frequency than 10 Hz.

In step 310, the vehicle body speed filtered in step 300 is differentiated to determine a vehicle body deceleration (i.e., the longitudinal acceleration).

In step 320, the vehicle body deceleration derived in step 310 is filtered using, for example, a low-pass filter to remove noise components higher than 2 Hz. Note that the vehicle body deceleration has a positive value during deceleration of the vehicle, while it has a negative value during acceleration of the vehicle.

FIG. 13 shows a sub-program executed in step 30 of FIG. 9 to determine the wheel state variables.

In step 400, an output of each of the wheel speed sensors 60, i.e., a wheel speed signal is filtered using a low-pass filter to remove noise components higher than 5 Hz which are caused by irregularities of a road surface.

In step 410, a specified one(s) of the wheel speed signals filtered in step 400 is corrected. If there is a wheel whose diameter is much smaller than any other wheels such as a temper tire-mounted wheel or a wheel whose tire inflation pressure is extremely lowered, the speed of that wheel is corrected to compensate for a difference in diameter between that wheel and the other wheels. This speed correction will be discussed later in detail with reference to FIG. 14. The detection of a wheel whose tire inflation pressure is lowered may be accomplished by analyzing resonant frequency components contained in the wheel speed signals outputted from the wheel speed sensors 60 based on the fact that a drop in tire inflation pressure will cause a resonant frequency of a tire to be lowered. Specifically, resonant frequency components contained in outputs of the wheel speed sensors 60 are compared to determine whether one of the resonant frequency components is lower than the others. If one of the resonant frequency components is lower than the others, the wheel producing the lowered resonant frequency component is identified as a wheel whose tire inflation pressure is much lower than that of the other wheels. The detection of a temper-tire mounted wheel may be accomplished by determining one of the wheels greater in speed than any other wheels when the vehicle is traveling straight without any wheel slippage as the temper-tire mounted wheel.

In steps 420 and 430, front and rear wheel state variables are determined based on speed differences between the front right and left wheels and between the rear right and left wheels, respectively. When all the wheels are not subjected to any skid (i.e., when the slip ratio has a value before the coefficient of adhesion $\mu$ between tire and road surface reaches the peak in the $\mu$-S characteristics), the front and rear wheel state variables correspond to lateral accelerations acting on a front wheel side and a rear wheel side of the vehicle body, respectively. When at least one of the wheels undergoes a skid, the front and rear wheel state variables correspond to limits of the adhesion coefficients on the front and rear wheel sides of the vehicle body, respectively. The determination of the front and rear wheel state variables will be discussed later in detail with reference to FIG. 15.

Figure 14:
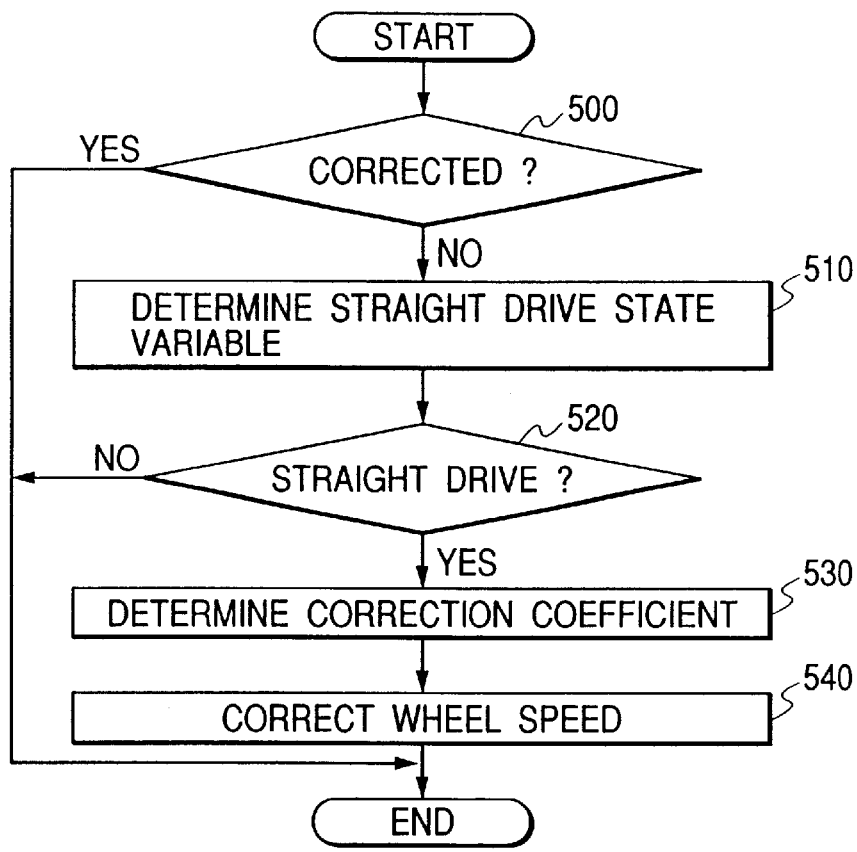
FIG. 14 is a flowchart of a sub-program executed in step 400 of FIG. 13 to correct the wheel speed.

The correction of the speed of each wheel performed in step 410 of FIG. 13 will be discussed with reference to FIG. 14.

In step 500, it is determined whether the wheel speed signal outputted from each of the wheel speed sensors 60 has been corrected or not. If a YES answer is obtained, then the routine terminates. Alternatively, if a NO answer is obtained, then the routine proceeds to step 510 wherein a straight drive state variable is determined by the following relation.

$$\max(VW^{}) - \min(VW^{}) \tag{6}$$

where  indicates each wheel, max ($VW^{}$) is the greatest one of the speeds of all the wheels, and the min ($VW^{**}$) is the smallest one of the speeds of all the wheels.

The routine proceeds to step 520 wherein it is determined whether the straight drive state variable derived in step 510 is less than a reference value kv (e.g., 2 km/s) or not. Specifically, it is determined whether the speeds of all the wheels fall within a constant range or not. If a NO answer is obtained (max ($VW^{}$)−min ($VW^{}$) ≧kv) meaning that the vehicle is not traveling straight, then the routine terminates. Alternatively, if a YES answer is obtained, then the routine proceeds to step 530 wherein a correction coefficient $C^{**}$ is determined by the following equation.

$$C^{} = (VW_{FR} + VW_{FL} + VW_{RR} + VW_{RL})/(4 \times VW^{}) \tag{7}$$

If one of the wheels whose diameter is determined in step 410 of FIG. 13 to be smaller than any other wheels is the front right wheel FR, then $C^{}=C_{FR}$, and $VW^{}=VW_{FR}$.

The routine proceeds to step 540 wherein the speed of the small-diameter wheel is corrected by multiplying it by the correction coefficient $C^{**}$.

Figure 15:
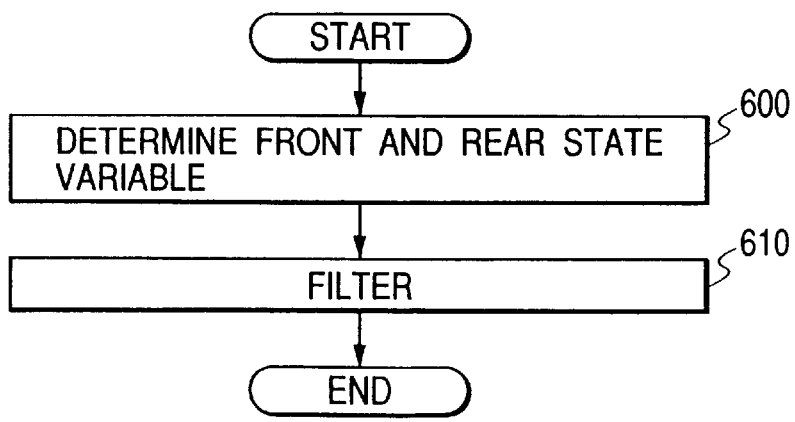
FIG. 15 is a flowchart of a sub-program executed in steps 420 and 430 of FIG. 13 to determine front and rear wheel state variables.

FIG. 15 shows a sub-program executed in steps 420 and 430 of FIG. 13 to determine the front and rear wheel state variables.

In step 600, the front wheel state variable stateW1 is determined in terms of a speed difference between the front right and left wheels according to the equation (8) below.

$$\text{stateW1} = (VW_{FRC} - VW_{FLC}) \times VX/TR = [(VW_{FRC})^2 - (VW_{FLC})^2]/(2 \times TR) \tag{8}$$

where TR is the tread width, the term ($VW_{FRC}-VW_{FLC}$)/TR indicates the yaw rate on a front side of the vehicle body, and $VW^{}$ C indicates the speed of each wheel after the correction in step 410 of FIG. 13**.

Similarly, the rear wheel state variable stateW2 is determined in terms of a speed difference between the rear right and left wheels according to the equation (9) below.

$$\text{stateW2} = (VW_{RRC} - VW_{RLC}) \times VX/TR = [(VW_{RRC})^2 - (VW_{RLC})^2]/(2 \times TR) \tag{9}$$

where the term ($VW_{RRC}-VW_{RLC}$)/TR indicates the yaw rate on a rear side of the vehicle body.

The sub-program executed in step 40 of FIG. 9 to determine the vehicle state will be described below with reference to FIG. 16.

In step 700, the direction of a turn of the vehicle is determined in at least one of five manners, as discussed below.

The first is to determine the direction of a turn based on the polarity of an output of the lateral acceleration sensor 50. For instance, the lateral acceleration sensor 50 is so designed that the output thereof has a positive polarity when the vehicle turns left, while it has a negative polarity when the vehicle turns right. Thus, if the output of the lateral acceleration sensor 50 has a positive value, then it is determined that the vehicle is turning left. The second is to determine the direction of a turn using a yaw rate sensor. The third is to determine the direction of a turn using a steering sensor designed to measure the angle and direction of rotation of a steering shaft accompanied by manual rotation of a steering wheel of the vehicle. The fourth is to determine the direction of a turn based on whether the front wheel state variable stateW1 shows a positive value or a negative value. The fifth is to determine the direction of a turn based on whether the rear wheel state variable stateW2 shows a positive value or a negative value. If either of the front and rear wheel state variables stateW1 and stateW2 shows a positive value, it is determined that the vehicle is turning left. Conversely, if either of the front and rear wheel state variables stateW1 and the stateW2 shows a negative value, it is determined that the vehicle is turning right.

In step 710, it is determined whether the vehicle state determined one program execution cycle earlier is unstable or not. In the first program execution cycle immediately after the ignition switch is turned on, it is determined that the vehicle state is stable. If a YES answer is obtained, then the routine proceeds to step 720 to determine a vehicle stability, which will be described later in detail with reference to FIG. 21. Alternatively, if a NO answer is obtained, then the routine proceeds to step 730 to determine a vehicle instability, as will be discussed below.

Figure 17:
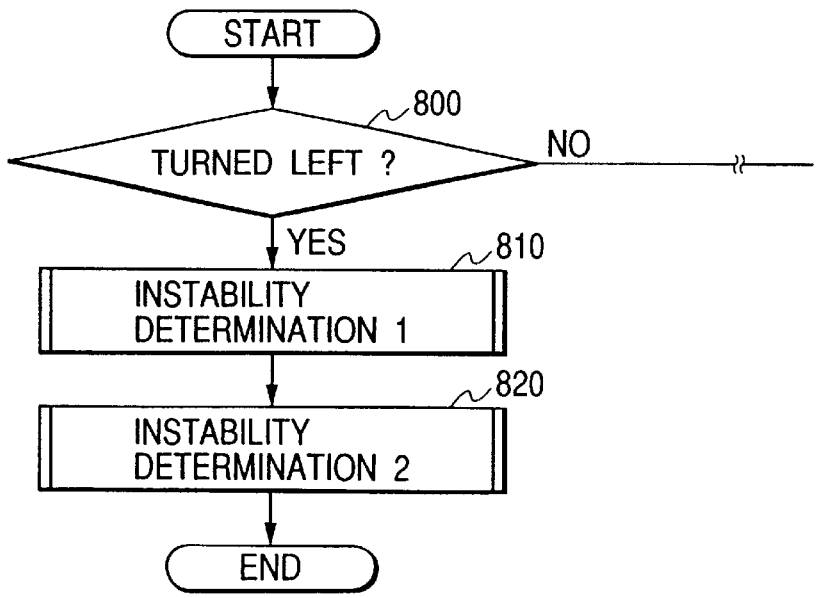
FIG. 17 is a flowchart of a sub-program executed in step 730 of FIG. 16 to determine instability of behavior of a vehicle body

After entering step 730, the routine proceeds to step 800 in FIG. 17 wherein it is determined whether the vehicle is turning to the left or not. If a YES answer is obtained, then the routine proceeds to step 810. Alternatively, if a NO answer is obtained meaning that the vehicle is turning to the right, control similar to that when the vehicle is turning to the left is performed, and explanation thereof in detail will be omitted here.

In step 810, an instability determination 1 is made, as will be discussed in detail with reference to FIG. 18. The instability of the whole of the vehicle body is determined using a state variable derived based on the wheel speed and a state variable derived based on an output of the lateral acceleration sensor 50.

Figure 19:
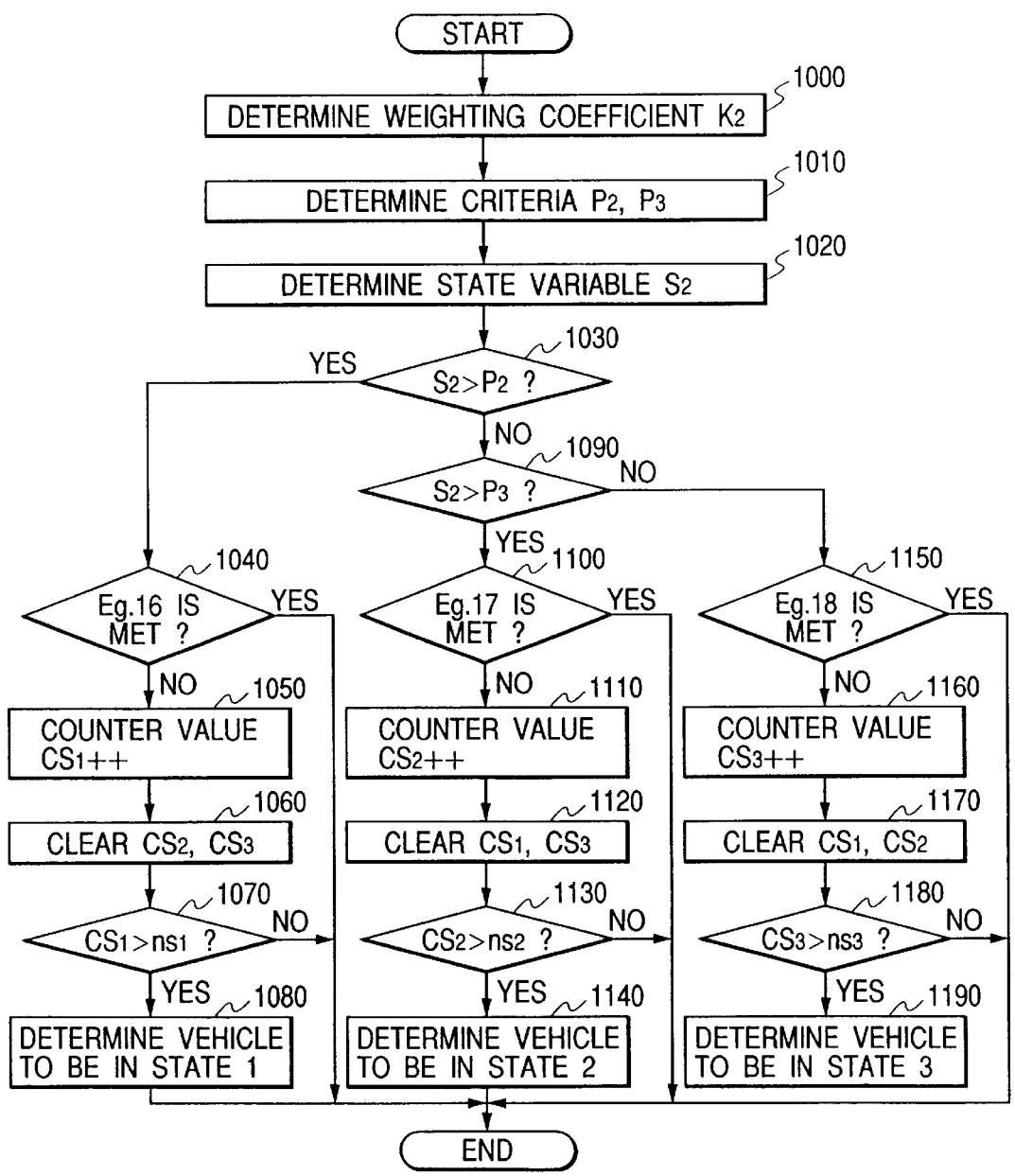
FIG. 19 is a flowchart of a sub-program executed in step 820 of FIG. 17 to determine the type of instability of behavior of a vehicle body.

In step 820, an instability determination 2 is made, as will be discussed in detail with reference to FIG. 19, to specify an unstable part of the vehicle body.

The instability determination 1 will be discussed below with reference to FIG. 18.

In step 900, a front state variable 1 is determined. The front state variable 1 is expressed in state 1 in the equation (10) below and calculated based on the front wheel state variable stateW1 and a vehicle state variable stateV1 derived by an output of a sensor which is installed directly on the vehicle body to measure behavior of the vehicle body (i.e., the lateral acceleration sensor 50).

$$state1 = stateW1 - stateV1 \tag{10}$$

In step 910, a rear state variable 2 (=state2) is determined according to the equation (11) below.

$$state2 = stateW2 - stateV2 \tag{11}$$

Here, stateV1 and stateV2 are $$stateV1 = stateV2 = GY \tag{12}$$

The front state variable state1 is a variable indicative of stability of a front portion of the vehicle body around the front right and left wheels. The rear state variable state2 is a variable indicative of stability of a rear portion of the vehicle body around the rear right and left wheels. The front and rear state variables state1 and state2 take smaller values when the stability is increased, while they take greater values when the instability is increased.

In step 920, a weighting coefficient K1 used in a following step 940 is determined. The weighting coefficient k1 may be a constant value (K1=0.5) or changed within a range from 0 to 1.0 with a vehicle state such as understeer or oversteer or a state of a steering wheel. The weighting coefficient K1 is, as can be seen from the equation (13) below, a value for determining which of the front state variable state1 (i.e., the degree of stability of the front portion of the vehicle body) and the rear state variable state2 (i.e., the degree of stability of the rear portion of the vehicle body) is to be weighted in determination of a state parameter S1, as will be described later, for determining the instability of the vehicle. Thus, if K1=0.5, the front state variable state1 and the rear state variable state2 are weighted equally.

The weighting coefficient K1 may alternatively be determined depending upon the acceleration or deceleration of the vehicle. For instance, in a case of a front engine front drive vehicle, the front wheels (i.e., driven wheels) are subjected to acceleration during acceleration of the vehicle. The weighting coefficient K1 is thus decreased (e.g., K1=0.2). During deceleration of the vehicle, the weight of the vehicle is shifted forward, thus causing the rear wheels (i.e., compliance wheels) to be locked more easily than the front wheels. The weighting coefficient K1 is thus increased (e.g., K1=0.8) to decrease the weight of the rear state variable state2. Specifically, the weighting coefficient K1 may be changed depending upon which of the front and rear wheels are driven wheels.

In step 930, the criterion P1 is determined. The criterion P1 may be a constant value (e.g., P1=2) or changed within a range of positive values with the state of the vehicle, steering, or braking. For instance, when the brake pedal 1 is depressed or when the baking effort of the engine is applied to the wheels, a difference in speed between the wheels tends to occur, which may result in an error of the control. In order to avoid this problem, the criterion P1 may be increased during braking. The criterion P1 may alternatively be changed with the coefficient of adhesion $\mu$ between tire and road surface. The coefficient of road-tire adhesion $\mu$ may be determined in a known manner or alternatively using an output of the lateral acceleration sensor 50. In a case where the output of the lateral acceleration sensor 50 is used, the criterion P1 is decreased as the lateral acceleration acting on the vehicle body is decreased and the coefficient of road-tire adhesion $\mu$ is decreased. This is because a difference in speed between the wheels will be decreased as the coefficient of road-tire adhesion $\mu$ is decreased, so that a range within in which the vehicle behavior is stable becomes narrower. The reason that the lateral acceleration acting on the vehicle body may be used in determining the coefficient of road-tire adhesion $\mu$ is because the lateral acceleration acting on the vehicle body bears a one-to-one correspondence to the lateral acceleration acting on each wheel until limits of the coefficients of road-tire adhesion $\mu$ of all the wheels are reached, so that the state parameter S1, as will be discussed later, is hardly increased up to the criterion P1 until at least one of the limits of the coefficients of road-tire adhesion $\mu$ is reached, however, if at least one of the wheels exceeds the limit of the coefficient of road-tire adhesion $\mu$ thereof, it will cause a difference between lateral accelerations acting on the vehicle body and that wheel to be developed, therefore, the lateral acceleration acting on the vehicle body (=the lateral acceleration acting on the wheels) at this time corresponds to the coefficient of road-tire adhesion $\mu$.

In step 940, the state parameter S1 is determined according to the equation (13) below.

$$S1 = K1 \times state1 + (1-K1) \times state2 \tag{13}$$

Specifically, the state parameter S1 is determined in terms of the front and rear state variables state1 and state2 derived based on the wheel state variables and the vehicle state variables in steps 900 and 910. The instability of the whole of the vehicle body or vehicle behavior may be determined accurately by adding the instability of the front portion of the vehicle body and the instability of the rear portion of the vehicle body.

In step 950, it is determined whether the state parameter S1 is greater than the criterion P1 or not. If a YES answer is obtained, then the routine proceeds to step 960 wherein an instability counter value n is incremented. Alternatively, if a NO answer is obtained, then the routine proceeds to step 970 wherein the instability counter value n is cleared In step 980, it is determined whether the instability counter value n is greater than a reference value n1 or not. If a YES answer is obtained, then the routine proceeds to step 990 wherein it is determined that the vehicle is in an unstable state as a whole. The reference value n1 may be changed with the state of braking of the vehicle and/or the coefficient of road-tire adhesion $\mu$. Specifically, the reference value n1 is increased as the criterion P1 is decreased, while it is decreased as the criterion P1 is increased. For instance, when the coefficient of road-tire adhesion $\mu$ is small, and the criterion P1 is also small, an increase in reference value n1 will cause a period of time until the routine proceeds to step 990 and determines the instability of the vehicle in step 990 to be prolonged, thereby avoiding an error in determination of the instability which would arise from the decrease of the criterion P1. It is advisable that the period of time until the determination of the instability of the vehicle be prolonged ten times or more.

The instability determination 2 made in step 820 of FIG. 17 to specify an unstable part of the vehicle body will be discussed below with reference to FIG. 19. Note that in an initial state following turning on of the ignition switch, it is determined that the vehicle is in a state 2, as will be discussed later.

In step 1000, a weighting coefficient K2 is determined. The weighting coefficient K2 may be a constant value within a range from 0 to 1.0 (e.g., K2=0.5 or changed over the range from 0 to 1.0. The weighting coefficient K2 may be determined in a manner similar to that used in determining the weighting coefficient K1 and may also be set equal to the weighting coefficient K1.

In step 1010, criteria P2 and P3 are determined. The criterion P2 is determined to be greater than zero (0), while the criterion P3 is determined to be smaller than zero (0). The criteria P2 and P3 may be determined in a manner similar to that used in determining the criterion P1.

In step 1020, a state parameter S2 is calculated according to the equation (14) below.

$$S2 = K1\, state1 - (1-K1)state2 \qquad (14)$$

The state parameter S2 is a parameter indicating which of the front and rear portions of the vehicle body is in a more unstable state. For instance, when the state parameter S2 has a positive value, the front portion of the vehicle body is more unstable than the rear portion, while when the state parameter S2 has a negative value, the rear portion of the vehicle body is more unstable than the front portion.

In step 1030, it is determined whether the state parameter S2 is greater than the criterion P2 or not. If a YES answer is obtained meaning that the front portion of the vehicle body is unstable more than a reference measure of instability, then the routine proceeds to step 1040. Alternatively, if a NO answer is obtained, then the routine proceeds to step 1090 wherein it is determined whether the state parameter S2 is greater than the criterion P3 or not. If a YES answer is obtained meaning that the rear portion of the vehicle body is unstable more than the reference measure of instability, then the routine proceeds to step 1100. Alternatively, if a NO answer is obtained, then the routine proceeds to step 1150.

Figure 20:
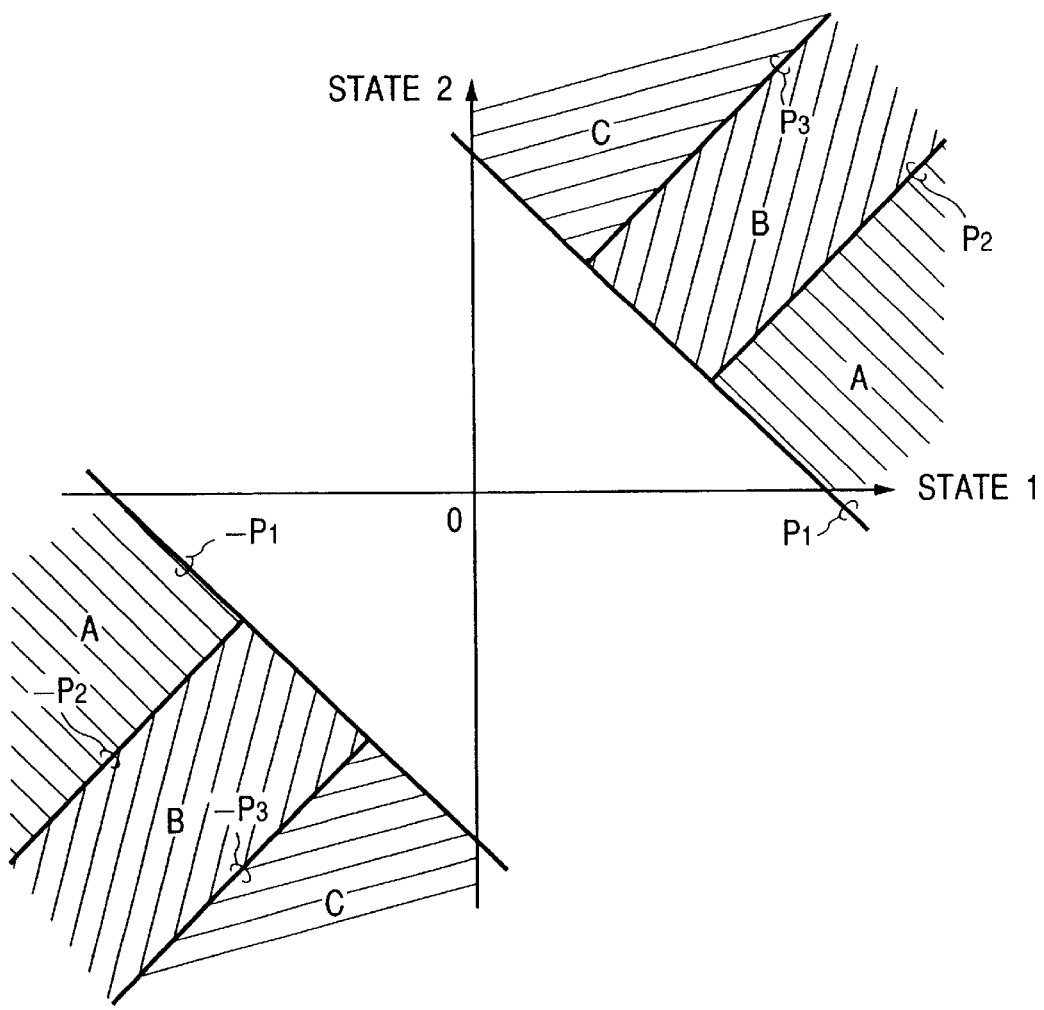
FIG. 20 is an illustration which shows the types of instability of behavior of a vehicle body determined in terms of front and rear state variables.

Steps 1040, 1100, and 1150 each specify a type of instability of the vehicle using a coordinate system, as shown in FIG. 20, defined by the front and rear state variables state1 and state2.

In FIG. 20, zones A, B, and C are defined by lines P1, −P1, P2, −P2, P3, and −P3. P1, P2, and P3 take values determined in steps 930 and 1010. An overall area consisting of the zones A, B, and C is expressed by the equation (15) below. The zones A, B, and C are expressed by the equations (16), (17), and (18) below, respectively.

$$|K1 \times state1 + (1-K1) \times state2| > P1 \qquad (15)$$

$$K2 \times |state| - (1-K2) \times |state2| > P2 \qquad (16)$$

$$P2 > K2 \times |state| - (1-K2) \times |state2| > P3 \qquad (17)$$

$$P3 > K2 \times |state1| - (1-K2) \times |state2| \qquad (18)$$

Figure 18:
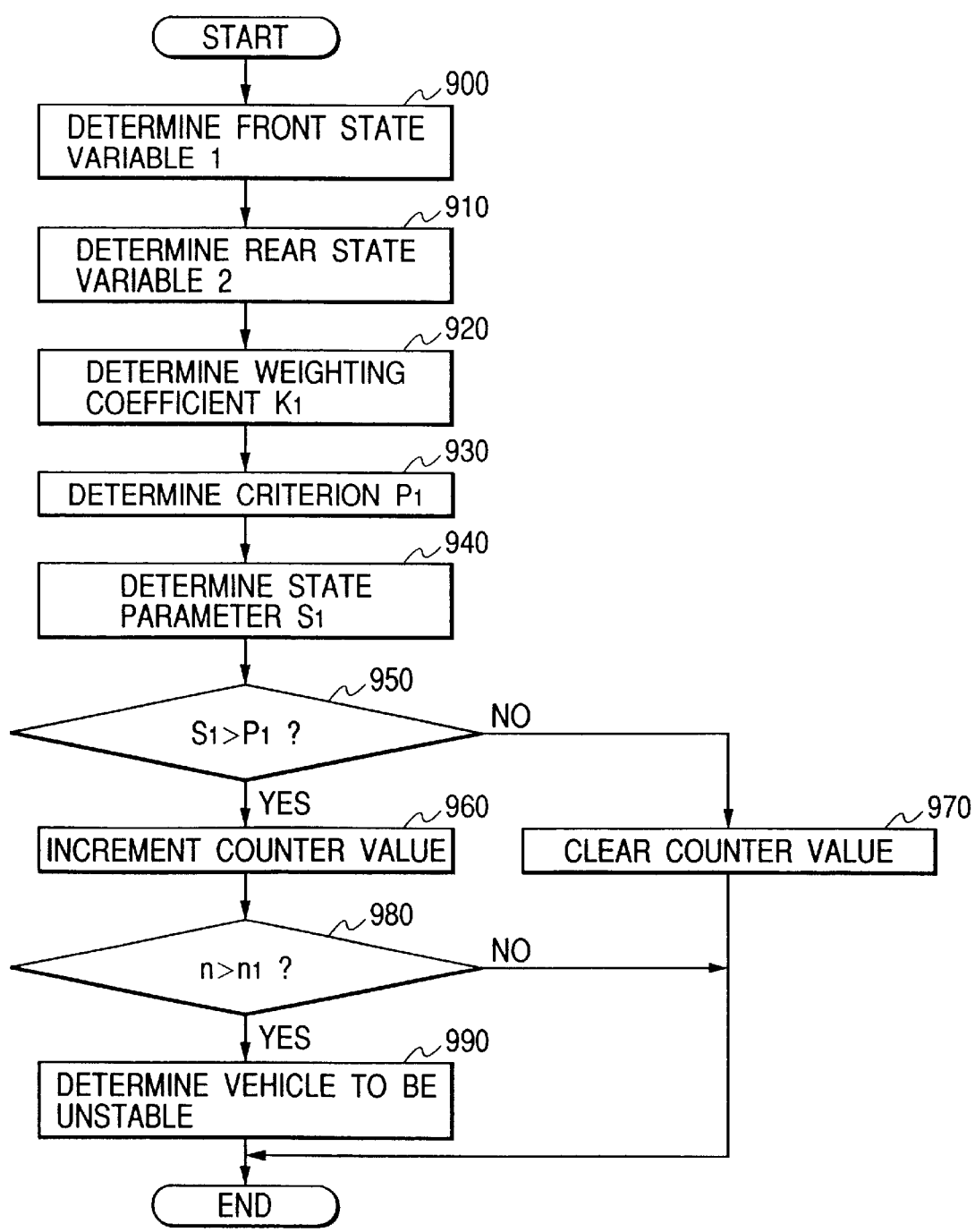
FIG. 18 is a flowchart of a sub-program executed in step 810 of FIG. 17 to calculate front and rear state variables for determining instability of behavior of a vehicle body.

The overall area defined by the equation (15) is an area within which the vehicle is in the unstable state as a whole, as discussed in step 990 of FIG. 18. This instability of the vehicle is further classified into three states (i.e., the zones A, B, and C) defined by the equations (16), (17), and (18). The zone A given by the equation (16) is an area within which the coefficient of road-tire adhesion of the front wheels reaches a limiting value thereof so that the front portion of the vehicle body is unstable. The zone B is an area within which the coefficients of road-tire adhesion of the front and rear wheels reach the limiting value. The zone C is an area within which the coefficient of road-tire adhesion of the rear wheels reaches the limiting value so that the rear portion of the vehicle body is unstable.

In step 1040, it is determined whether the equation (16) is met or not. If a YES answer is obtained, then the routine terminates. Alternatively, if a NO answer is obtained meaning that the vehicle lies in the zone A, then the routine proceeds to step 1050 wherein a counter value CS1 is incremented. The routine proceeds to step 1060 wherein counter values CS2 and CS3 are cleared. The routine proceeds to step 1070 wherein it is determined whether the counter value CS1 is greater than a reference value ns1 or not. The counter value CS1 indicates the length of time the vehicle falls in the zone A. If a YES answer is obtained, then the routine proceeds to step 1080 wherein it is determined that the vehicle falls within the zone A over a reference duration (i.e., the reference value ns1) and that the vehicle is in the state 1 where the instability of the vehicle results from the fact that the front wheels have reached the limit of the coefficient of road-tire adhesion $\mu$.

In step 1100, it is determined whether the equation (18) is met or not. If a YES answer is obtained, then the routine terminates. Alternatively, if a NO answer is obtained meaning that the vehicle lies in the zone C, then the routine proceeds to step 1110 wherein the counter value CS2 is incremented. The routine proceeds to step 1120 wherein the counter values CS1 and CS3 are cleared. The routine proceeds to step 1130 wherein it is determined whether the counter value CS2 is greater than a reference value ns2 or not. The counter value CS2 indicates the length of time the vehicle falls in the zone C. If a YES answer is obtained in step 1130, then the routine proceeds to step 1140 wherein it is determined that the vehicle falls within the zone C over a reference duration (i.e., the reference value ns2) and that the vehicle is in the state 2 where the instability of the vehicle results from the fact that the rear wheels have reached the limit of the coefficient of road-tire adhesion μ.

In step 1150, it is determined whether the equation (17) is met or not. If a YES answer is obtained, then the routine terminates. Alternatively, if a NO answer is obtained meaning that the vehicle lies in the zone B. then the routine proceeds to step 1160 wherein the counter value CS3 is incremented. The routine proceeds to step 1170 wherein the counter values CS1 and CS2 are cleared. The routine proceeds to step 1180 wherein it is determined whether the counter value CS3 is greater than a reference value ns3 or not. The counter value CS3 indicates the length of time the vehicle falls in the zone B. If a YES answer is obtained in step 1180, then the routine proceeds to step 1190 wherein it is determined that the vehicle falls within the zone B over a reference duration (i.e., the reference value ns3) and that the vehicle is in the state 3 where the instability of the vehicle results from the fact that the front and rear wheels have reached the limit of the coefficient of road-tire adhesion μ.

The reference values ns1, ns2, and ns3 may be changed in a manner similar to that used in determining the reference value n1.

Figure 21:
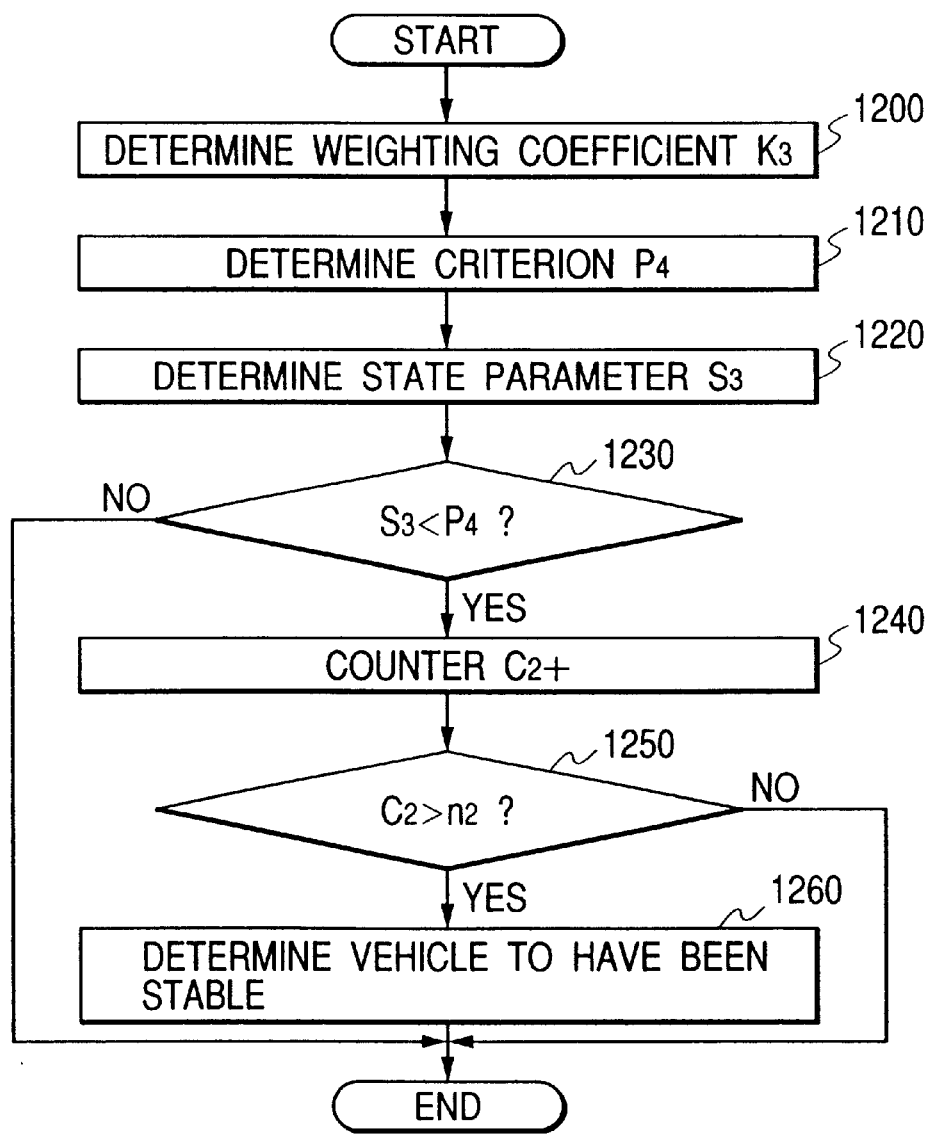
FIG. 21 is a flowchart of a sub-program executed in step 720 of FIG. 16 to determine stability of behavior of a vehicle body.

FIG. 21 shows a sub-program executed in step 720 of FIG. 16 to determine the vehicle stability.

In step 1200, a weighting coefficient K3 ($0 \leq K3 \leq 1$) is determined. The weighting coefficient K3 may be equal to the weighting coefficient K2, as described above, or determined in a manner similar to that used in determining the weighting coefficient K1.

In step 1210, a criterion P4 is determined which is used in a following step 1230. The criterion P4 is determined to be smaller than the criterion P1 used in determining the instability of the vehicle as a whole in FIG. 18 and may be changed with the state of steering and/or braking in the same manner as used in determining the criterion P1.

In step 1220, a state parameter S3 is calculated according to the equation (19) below.

$$S3 = K3 \cdot \text{state1} + (1-K3) \cdot \text{state2} \quad (19)$$

The state parameter S3 is set equal to the state parameter S1 if the weighting coefficient K3 is identical with the weighting coefficient K2.

In step 1230, it is determined whether the state parameter S3 is smaller than the criterion P4 or not. The criterion P4 is, as described above, smaller than the criterion P1 used in FIG. 18. Step 1230, thus, determines whether the current instability of behavior of the vehicle is lower than the limiting value of instability of the vehicle at which the vehicle behavior control should be performed or not. If a NO answer is obtained in step 1230, then the routine terminates. Alternatively, if a YES answer is obtained, then the routine proceeds to step 1240 wherein a counter value C2 is incremented. The routine proceeds to step 1250 wherein it is determined whether the counter value C2 is greater than a reference value n2 or not. The counter value C2 indicates the length of time the vehicle is in a stable state after returning from the unstable state. If a YES answer is obtained meaning that the duration of stability of the vehicle exceeds the reference value n2, then the routine proceeds to step 1260 wherein it is determined that the behavior of the vehicle has become stable completely, and the valves in the hydraulic system are deactivated, as will be discussed later in detail.

The reference value n2 may be changed with the value of the criterion P4 in the same manner as used in determining the reference value n1. The execution of step 1250 in which the counter value C2 is compared with the reference value n2 prior to step 1260 forces the control of behavior of the vehicle to continue to be performed for a constant period of time even if the speeds of the wheels are changed by the behavior control of the vehicle or application of brakes to the wheels, and it becomes difficult to determine the state of the vehicle accurately, thereby avoiding the hunting of the control, in other words, preventing the behavior control of the vehicle from being terminated immediately after the brake is applied to at least one of the wheels, resulting in a rapid increase in difference in speed between the wheels.

The behavior control of the vehicle or control of the valves in the hydraulic system shown in FIG. 3 which is performed in steps 50 and 60 of FIG. 9 will be discussed with reference to FIGS. 22 to 30.

FIG. 22 shows a brake control program executed in step 50 to determine the controlled variable for each wheel (i.e., the wheel cylinder pressure applied as the braking effort to each wheel).

In step 1300, a control flag, as will be described later in FIG. 18, is set.

Figure 23:
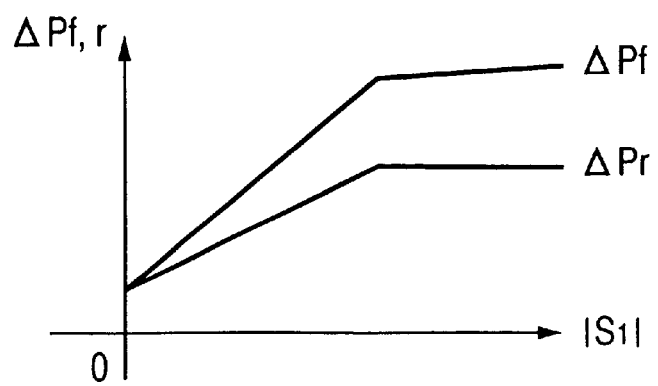
FIG. 23 is a graph which shows the relation between a state parameter and basic controlled variables.

In step 1310, basic controlled variables ΔPf and ΔPr are determined. The basic controlled variables ΔPf and ΔPr indicate basic hydraulic pressures produced for the front wheel cylinders 4 and 5 and the rear wheel cylinders 34 and 35, respectively, and are determined as a function of an absolute value of the state parameter S1 by look-up using a map, as shown in FIG. 23.

In step 1320, correction coefficients Kf and Kr for the basic controlled variables ΔPf and ΔPr are determined in a manner, as will be discussed later in FIGS. 25 and 26.

In step 1330, the controlled variables, as will be described in detail with reference to FIG. 27, are determined which indicate the wheel cylinder pressures applied to the front and rear wheel cylinders 4, 5, 34, and 35, respectively.

The setting of the control flag in step 1300 will be described below with reference to FIG. 24.

In step 1400, it is determined whether a control enable condition is satisfied or not. For example, it is determined whether the sensors (i.e., the lateral acceleration sensor 50, the wheel speed sensors 60, and the M/C pressure sensor 70) and the actuators (i.e., the linear differential pressure control valve 61, the pressure elevation control valves 71 and 81, the pressure reduction control valves 11 and 12, etc.) operate normally or not. The check valve 15 and the switch reservoir 101 have the mechanical structures and thus need not be checked for electrical failure. If a YES answer is obtained meaning that the sensors and the actuators are not malfunctioning, then the routine proceeds to step 1410. Alternatively, if a NO answer is obtained, then the routine proceeds to step 1430 wherein a control flag F is turned off.

In step 1410, it is determined whether the vehicle is in an unstable state or not based on results of determination in steps 710 to 730 of FIG. 16. If a NO answer is obtained, then the routine proceeds to step 1440 wherein it is determined whether the vehicle was determined to be unstable one program cycle earlier or not. If a YES answer is obtained, then the routine proceeds to step 1450 wherein the control flag F is turned off. The routine proceeds to step 1460 wherein a control termination flag FF is turned on.

If a NO answer is obtained in step 1440, then the routine proceeds to step 1470 wherein it is determined whether the control termination flag FF is turned on or not. If a NO answer is obtained, then the routine terminates. Alternatively, if a YES answer is obtained, then the routine proceeds to step 1480 wherein a counter value CE is incremented. The routine proceeds to step 1490 wherein it is determined whether the counter value CE is greater than a reference value ne or not. If a NO answer is obtained, then the routine terminates. Alternatively, if a YES answer is obtained, then the routine proceeds to step 1500 wherein the control termination flag FF is turned off. The routine proceeds to step 1510 wherein the counter value CE is cleared.

Figure 24:
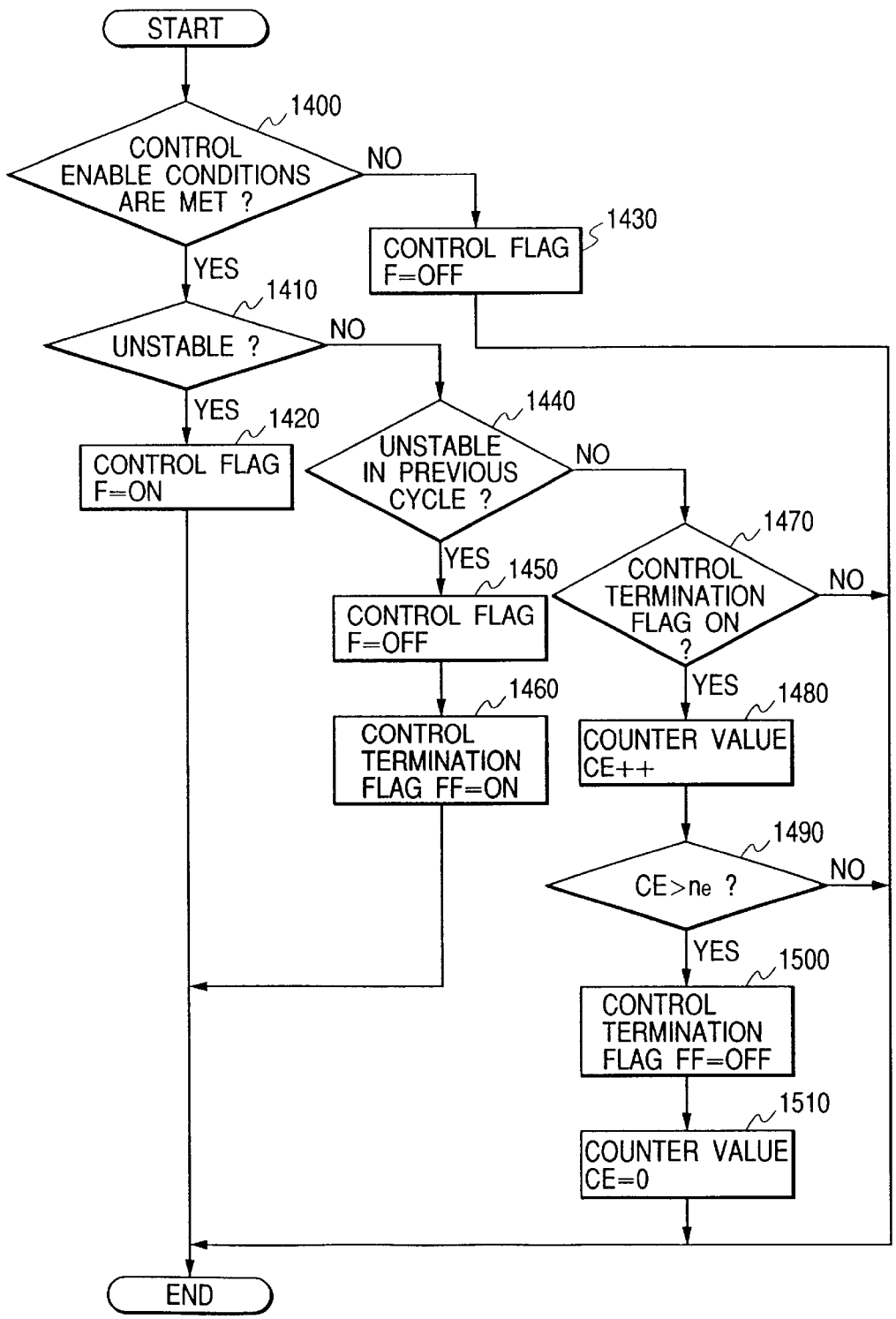
FIG. 24 is a flowchart of a sub-program executed in step 1300 of FIG. 22 to provide control and control termination flags.

As can be seen from FIG. 24, at the end of the control, that is, when the vehicle behavior has become stable, the control termination flag FF is turned on. At this time, the wheel cylinder pressure of each of the wheel cylinders 4, 5, 34, and 35 is regulated gradually or stepwise using pulse signals so as to agree with the master cylinder pressure. Specifically, in a terminal phase of the control, the master cylinder pressure measured by the M/C pressure sensor 70 is compared with the wheel cylinder pressure estimated by the controlled hydraulic pressure or the state of the valves in the hydraulic system. When the master cylinder pressure is greater than the wheel cylinder pressure, the wheel cylinder pressure is increased gradually at a given rate, while when the master cylinder pressure is smaller than the wheel cylinder pressure, the wheel cylinder pressure is decreased gradually at the given rate to bring the wheel cylinder pressure into agreement with the master cylinder pressure. The control, thus, continues to be performed for a period of time without being stopped instantaneously even when the vehicle has become stable, thereby avoiding the turbulence of behavior of the vehicle at the end of the control.

Figure 25:
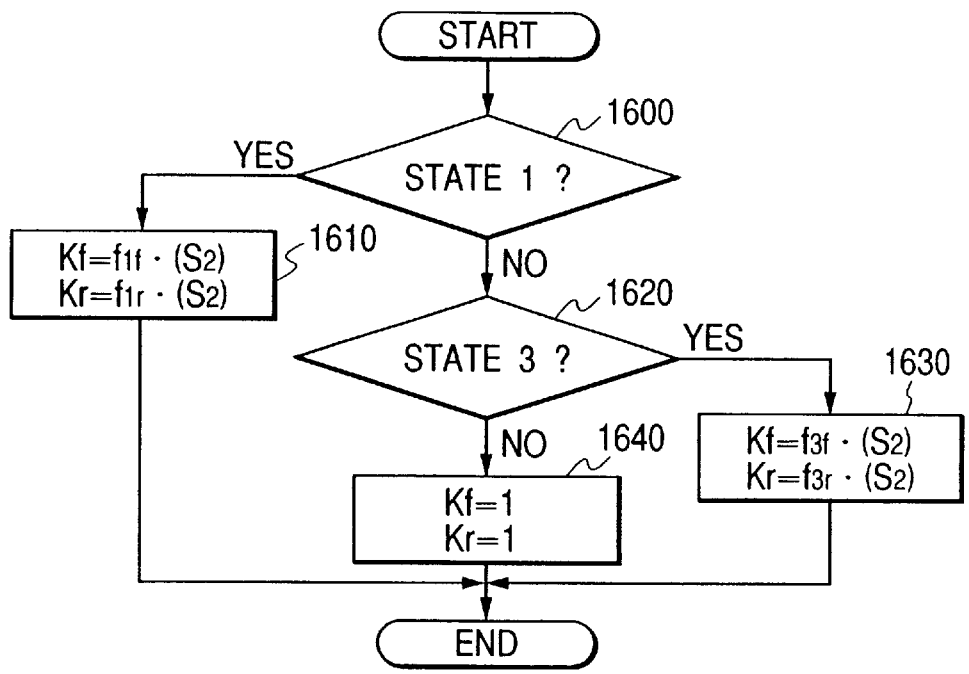
Figure 26:
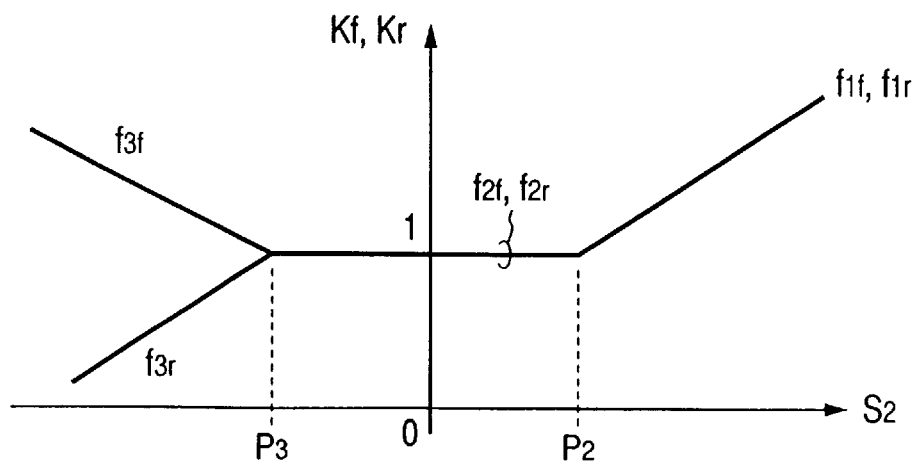
FIG. 26 is a graph which shows the relation between correction coefficients and a state parameter.

FIG. 25 shows a sub-program executed in step 1320 of FIG. 22 to determine the correction coefficients Kf and Kr for the basic controlled variables ΔPf and ΔPr.

In step 1600, it is determined whether the vehicle is determined to be in the state 1 in step 1080 or not. If a YES answer is obtained, then the routine proceeds to step 1610 wherein the correction coefficients Kf and Kr are set to f1f(S2) and f1r(S2) as a function of the state parameter S2, respectively, by look-up using a map, as shown in FIG. 26.

If a NO answer is obtained in step 1600, then the routine proceeds to step 1620 wherein it is determined that the vehicle is determined to be in the state 1 in step 1190 or not. If a YES answer is obtained, then the routine proceeds to step 1630 wherein the correction coefficients Kf and Kr are set to f3f(S2) and f3r(S2) as a function of the state parameter S2, respectively, by look-up using the map, as shown in FIG. 26. Alternatively, if a NO answer is obtained, then the routine proceeds to step 1640 wherein the correction coefficients Kf and Kr are set to f2f=1 and f2r=1 (i.e., Kf=Kr= f2f=f2r=1).

FIG. 27 shows a sub-program executed in step 1330 to determine the controlled variables for the front and rear wheel cylinders 4, 5, 34, and 35.

In step 1700, it is determined whether the control flag F is turned on or not. If a YES answer is obtained, then the routine proceeds to step 1710 wherein it is determined whether the vehicle is turning to the left or not. If a YES answer is obtained, then the routine proceeds to step 1720 wherein a coefficient Kc is set to one (1). Alternatively, if a NO answer is obtained, then the routine proceeds to step 1730 wherein the coefficient Kc is set to minus one (−1).

In step 1740, the controlled variables ΔPFR, ΔPFL, ΔPRR, and ΔPRL indicating controlled changes in wheel cylinder pressure of the wheel cylinders 4, 5, 34, and 35 for the front right, front left, rear right, and rear left wheels are determined according to the equations (20) to (23) below.

$$\Delta P_{FR} = Kc \times Kf \times \Delta Pf \quad (20)$$
$$\Delta P_{FL} = -Kc \times Kf \times \Delta Pf \quad (21)$$
$$\Delta P_{RR} = Kc \times Kr \times \Delta Pr \quad (22)$$
$$\Delta P_{RL} = -Kc \times Kr \times \Delta Pr \quad (23)$$

In step 1750, a control pattern for each wheel is determined using a corresponding one of the controlled variables ΔPFR, ΔPFL, ΔPRR, and ΔPRL, respectively, which will be described later with reference to FIG. 28.

If a NO answer is obtained in step 1700, then the routine proceeds to step 1760 wherein it is determined whether the control termination flag FF is turned on or not. If a NO answer is obtained, then the routine terminates. Alternatively, if a YES answer is obtained, then the routine proceeds to step 1770 wherein a control pattern for each wheel, i.e., the wheel cylinder pressure applied to each of the wheel cylinders 4, 5, 34, and 35 at the end of the control is determined in the manner as described above.

Referring to FIG. 28, in step 1800, a target hydraulic pressure Pt for each of the wheel cylinders 4, 5, 34, and 35 is determined according to the equation (24) below.

$$Pt^{} = Pmc + \Delta P^{} \quad (24)$$

where Pmc indicates the master cylinder pressure which may be determined using an output of the M/C pressure sensor 70 or estimated mathematically, and ΔP** indicates the controlled variable for each wheel determined by one of the above equations (20) to (23).

In step 1810, the wheel cylinder pressure Pe of each of the wheel cylinders 4, 5, 34, and 35 is determined. This determination may be made using outputs of pressure sensors (not shown) installed in the hydraulic lines near the wheel cylinders 4, 5, 34, and 35 (e.g., in a case of the wheel cylinder 4, a portion of the branch line A1 between the pressure elevation control valve 71 and the wheel cylinder 4) or alternatively by look-up using maps in terms of a solenoid-energizing signal output pattern and hydraulic output characteristics of the pressure elevation control valves 71, 81, 371, and 381 and the pressure reduction control valves 11, 12, 41, and 42**.

In step 1820, a hydraulic control parameter R** is determined according to the equation (25) below which is used under the PID-control in determining whether the wheel cylinder pressure for each wheel.

$$R^{} = PID(Pt^{}, Pe^{**}) \quad (25)$$

In step 1830, an inclination of the hydraulic control parameter R** is restricted to control a change in wheel cylinder pressure.

Figure 29:
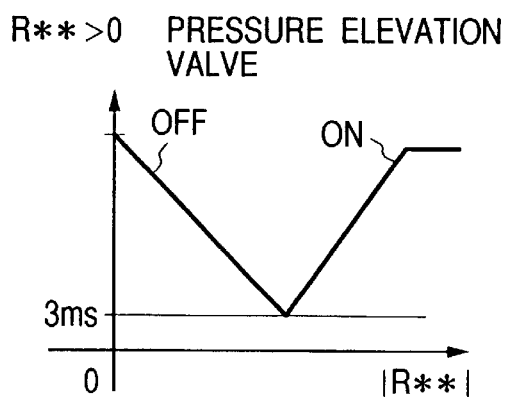
FIG. 29 is a time chart which shows activation of pressure elevation valves under control of vehicle behavior.
Figure 30:
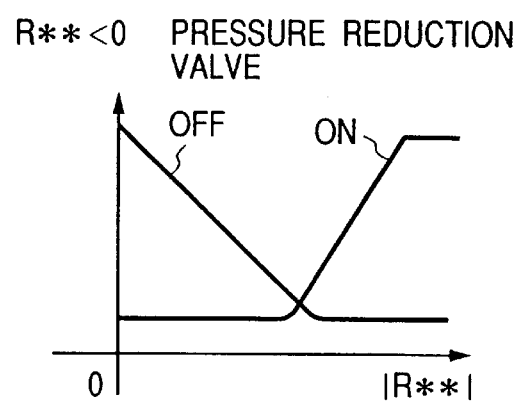
FIG. 30 is a time chart which shows activation of pressure reduction valves under control of vehicle behavior.

In step 1840, a control signal output pattern (i.e., an energized pattern of a solenoid) for each of the pressure elevation control valve 71, 81, 371, and 381 and the pressure reduction control valves 11, 12, 41, and 42 is determined using maps, as shown in FIGS. 29 and 30.

The operation of the vehicle behavior control apparatus will be discussed below with reference to FIGS. 31 and 32.

Figure 31:
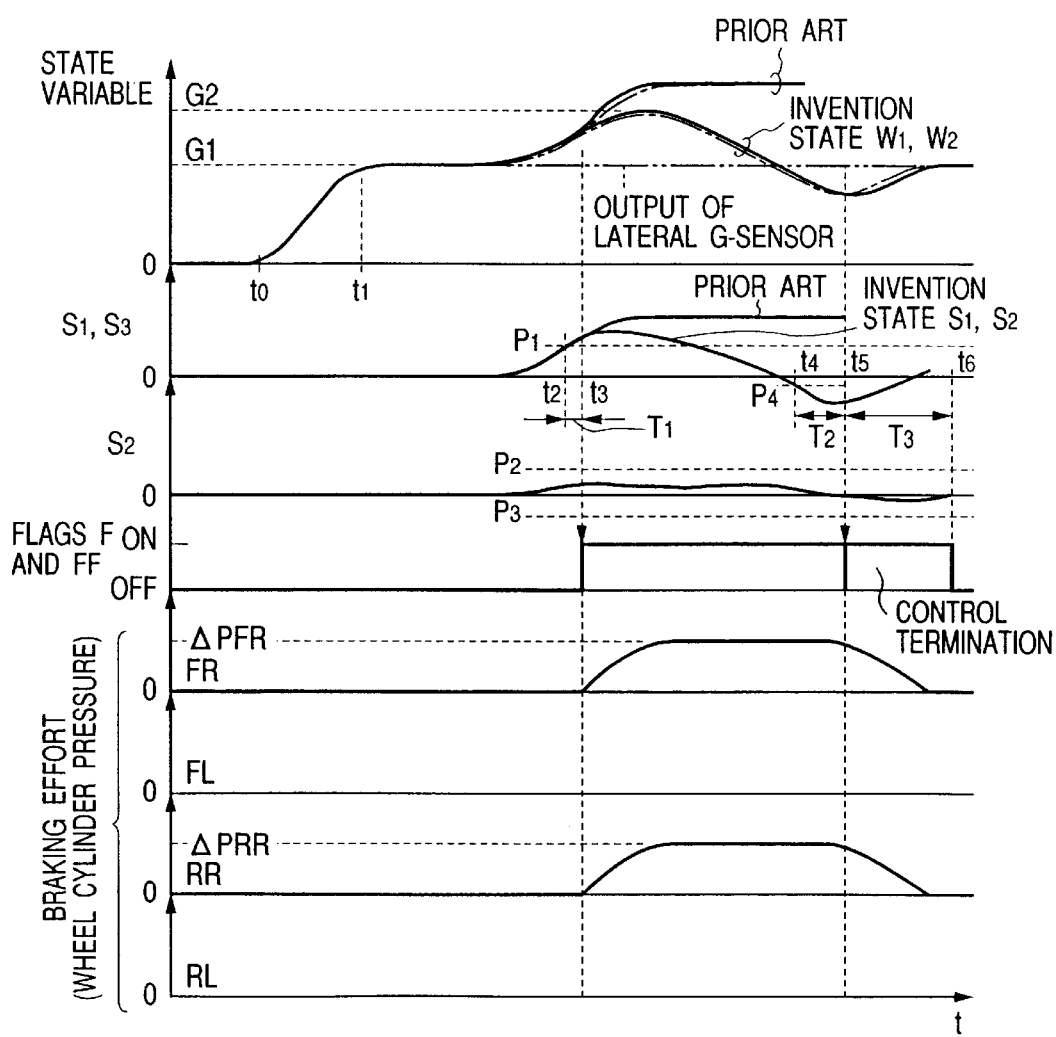
FIG. 31 is a time chart which shows the wheel cylinder pressure for each wheel regulated based on a state variable of a vehicle body when the tack-in takes place and state parameters S1 to S3 during turning to the left without braking.

FIG. 31 shows the wheel cylinder pressure for each wheel regulated based on the state variable of the vehicle body (i.e., the lateral acceleration acting on the vehicle body) when the tack-in takes place and the state parameters S1 to S3 during turning to the left with no braking.

Assume that the vehicle starts to turn to the left at time t0, and the lateral acceleration acting on the vehicle body reaches G1 at time t1 and then is kept constant.

When the state parameter S1 exceeds the criterion P1 at time t2, after a lapse of a time interval T1 (=n1×ΔT where n1 is the reference value used in step 980 of the instability determination 1, and ΔT is one execution cycle of the vehicle behavior control program) between t2 and t3, the control flag F is turned on. Upon turning on of the control flag F, the wheel cylinder pressures ΔP_FR=Kf×ΔPf and ΔP_RR=Kr×ΔPr are applied to the wheel cylinders 4 and 34 for the front right wheel FR and the rear right wheel RR. These braking efforts applied to the front right and rear right wheels FR and RR cause the wheel state variables stateW1 and stateW2, as indicated by solid and broken lines in FIG. 31 respectively, to be decreased after reaching G2. At time t4, the state parameter S1 becomes smaller than the criterion P4. At time t5 after a lapse of time T2, the control flag F is turned off. The time T2 is given by a relation of T2=n2×ΔT where n2 is the reference value used in step 1250 of FIG. 21. At the same time as the control flag F is turned off, the control termination flag FF is turned on and kept on for a period of time T3 until time t6. The period of time T3 is given by T3=ne×ΔT where ne is the reference value used in step 1490 of FIG. 24.

Figure 32:
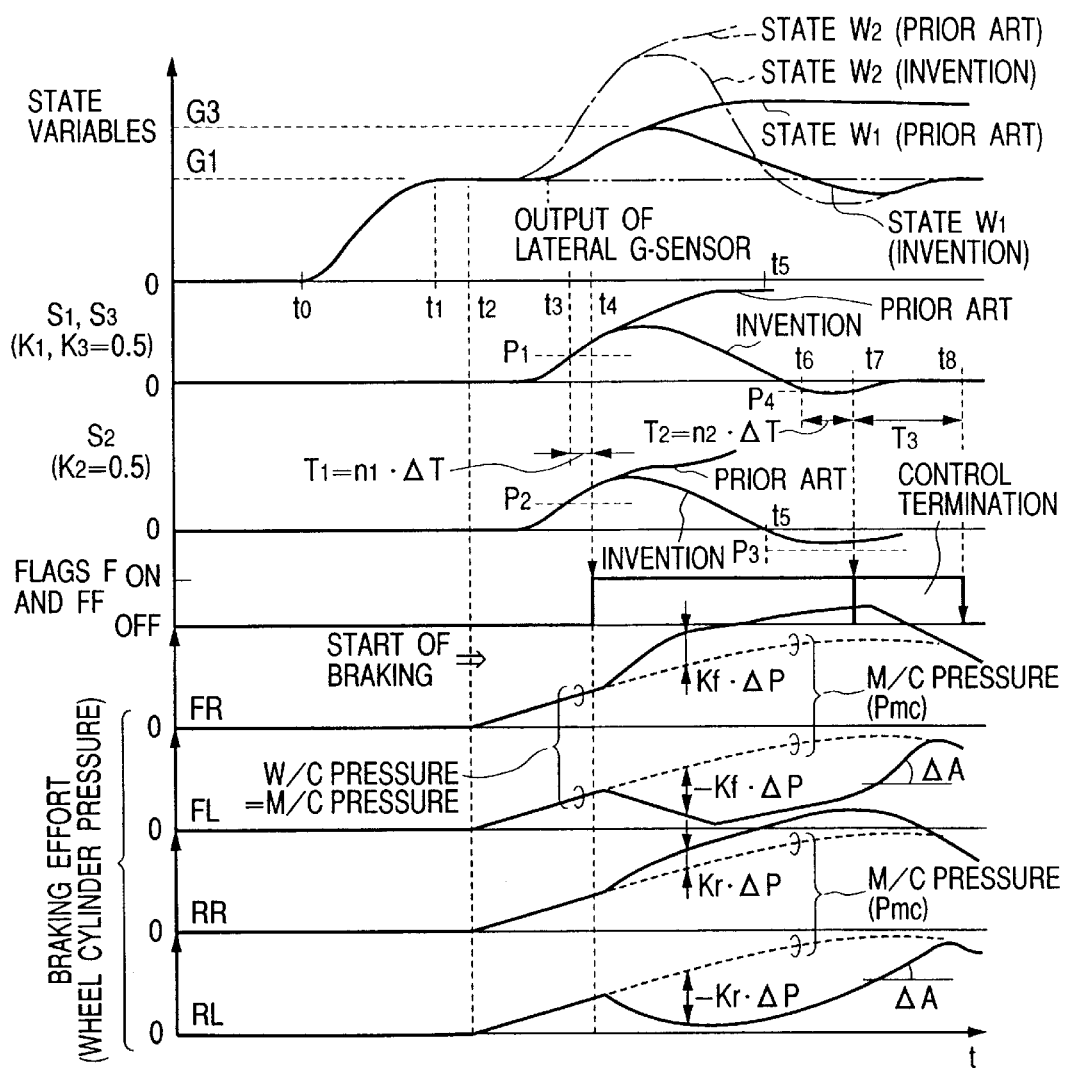
FIG. 32 is a time chart which shows the wheel cylinder pressure for each wheel regulated based on a state variable of a vehicle body and state parameters S1 to S3 during turning to the left with braking.

FIG. 32 shows the wheel cylinder pressure for each wheel regulated based on the state variable of the vehicle body (i.e., the lateral acceleration acting on the vehicle body) and the state parameters S1 to S3 during turning to the left and during braking.

Assume that the vehicle starts to turn to the left at time t0, the lateral acceleration acting on the vehicle body reaches G1 at time t1 and then is kept constant, and the vehicle operator starts to depress the brake pedal 1 at time t2 so that the master cylinder pressure Pmc rises to elevate the wheel cylinder pressure in each of the wheel cylinders 4, 5, 34, and 35.

When the state parameter S1 exceeds the criterion P1 at time t3, after a lapse of the time interval T1 (=n1×ΔT) between time t3 and the time t4, the control flag F is turned on. Upon turning on of the control flag F, the wheel cylinder pressures ΔP_FR and ΔP_RR applied to the wheel cylinders 4 and 34 for the front right wheel FR and the rear right wheel RR are increased by amounts (=Kf×ΔPf and Kr×ΔPr), respectively. At the same time, the wheel cylinder pressures ΔP_FR and ΔP_RR applied to the wheel cylinders 5 and 35 for the front left wheel FL and the rear left wheel RL are decreased by amounts (=Kf×ΔPf and Kr×ΔPr), respectively. This causes the wheel state variables stateW1 and stateW2, as indicated by solid and broken lines in FIG. 32 respectively, to be decreased gradually. At time t5, the state parameter S2 indicating which of the front and rear portions of the vehicle body is in a more unstable state becomes smaller than zero (0), but is kept above the criterion P3. At time t6, the state parameter S1 indicating the instability of the vehicle becomes smaller than the criterion P4. At time t7 after a lapse of time T2, the control flag F is turned off. The time T2 is given by a relation of T2=n2×ΔT where n2 is the reference value used in step 1250 of FIG. 21. At the same time as the control flag F is turned off, the control termination flag FF is turned on and kept on for a period of time T3 until time t8. The period of time T3 is given by T3=ne×ΔT where ne is the reference value used in step 1490 of FIG. 24.

Each wheel cylinder pressure is converged on the master cylinder pressure gradually after time t7. For instance, the wheel cylinder pressures for the front left wheel FL and the rear left wheel RL are increased at a rate ΔA. The rate ΔA may be changed with a running condition or a road surface condition which would cause the behavior of the vehicle to change. For instance, when the vehicle is steered rapidly or the coefficient of road-tire adhesion μ is low (e.g., during traveling on a snowy or icy road), the rate ΔA may be lowered to decrease the rate of pulse-increase or pulse-decrease in wheel cylinder pressure for avoiding rapid change in behavior of the vehicle accompanied by the termination of the control. Additionally, when the state parameter S2 is great or when the lateral acceleration acting on the vehicle body is great, the rate ΔA may be decreased to decrease the rate of pulse-increase or pulse-decrease in wheel cylinder pressure for avoiding an unwanted change in behavior of the vehicle immediately after the vehicle behavior becomes stable. The rate ΔA may be changed with the coefficient of road-tire adhesion μ, rapid steering, the state parameter S2 or a combination thereof.

As apparent from the above discussion, the behavior control of the vehicle which takes the effects of critical conditions of the wheels on the behavior of the vehicle into account is achieved by the hydraulic control of brakes using the state parameter S1 indicating the stability and instability of the whole of the vehicle body, the state parameter S2 indicating which of the front and rear portions of the vehicle body is in a more unstable state, and the state parameter S3 indicating the stability of the vehicle body.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the front and rear wheel state variables stateW1 and stateW2 are determined in step 600 of FIG. 15 based on differences in speed between the front right and left wheels and between the rear right and left wheels, respectively, but they may alternatively be determined using differences in speed between the front right and rear left wheels and between the front left and rear right wheels, respectively, according to the equations (26) and (27) below.

$$\text{stateW1}=(V_{WFRC}-V_{WRLC})\times V_X/T_R \tag{26}$$

$$\text{stateW2}=(V_{WRRC}-V_{WFLC})\times V_X/T_R \tag{27}$$

In this case, the front state variable state1 will be a parameter indicating the state of the vehicle body in a diagonal direction from the front right to the rear left wheel. The rear state variable state2 will be a parameter indicating the state of the vehicle body in a direction from the front left to the rear right wheel.

The lateral acceleration sensor 50 is implemented with the lateral G-sensor measuring the lateral acceleration acting on the vehicle body directly or the yaw rate sensor measuring the yaw rate of angular motion applied to the vehicle body, but the vehicle behavior control apparatus may be equipped with both the lateral G-sensor and the yaw rate sensor. In this case, the parameters stateV1 and stateV2 used in the equations (10) and (11) may be expressed as follows:

$$\text{stateV1}=GY+Lf\times\delta yr \tag{28}$$

$$\text{stateV2}=GY-Lr\times\delta yr \tag{29}$$

where Lf and Lr indicate distances between the center of gravity of the vehicle body and the front axle and between the center of gravity of the vehicle body and the rear axle, respectively, and δ yr is a differentiated value of the yaw rate.

The determination of instability using the state variables state1 and state2 calculated based on the above parameters stateV1 and stateV2 further increase the accuracy of the vehicle behavior control.

What is claimed is:

1. A brake control apparatus for a vehicle comprising:

a master cylinder producing pressure of a brake fluid when braking the vehicle;

a first and a second wheel cylinder receiving the pressure of the brake fluid from said master cylinder pressure to apply braking efforts to a first and a second wheel, respectively;

a third and a fourth wheel cylinder receiving the pressure of the brake fluid from said master cylinder to applying braking efforts to a third and a fourth wheel, respectively;

a first hydraulic line connecting said master cylinder and said first and second wheel cylinders;

a second hydraulic line connecting said master cylinder and said third and fourth wheel cylinders;

a first pressure elevation/reduction actuator set disposed between said master cylinder and said first and second wheel cylinders in said first hydraulic line to selectively elevate and reduce the pressure of the brake fluid applied to said first and second wheel cylinders;

a second pressure elevation/reduction actuator set disposed between said master cylinder and said third and fourth wheel cylinders in said second hydraulic line to selectively elevate and reduce the pressure of the brake fluid applied to said third and fourth wheel cylinders;

a first differential pressure control valve disposed between said master cylinder and said first pressure elevation/reduction actuator set in said first hydraulic line, regulating flow of the brake fluid between a first portion of said first hydraulic line connecting with said master cylinder and a second portion of said first hydraulic line connecting with said first pressure elevation/reduction actuator set to control a difference in pressure of the brake fluid between the first and second portions;

a second differential pressure control valve disposed between said master cylinder and said second pressure elevation/reduction actuator set in said second hydraulic line, regulating flow of the brake fluid between a first portion of said second hydraulic line connecting with said master cylinder and a second portion of said second hydraulic line connecting with said second pressure elevation/reduction actuator set to control a difference in pressure of the brake fluid between the first and second portions of said second hydraulic line;

a first pump disposed in said first hydraulic line, delivering pressure of the brake fluid to said first and second wheel cylinders and returning an amount of the brake fluid equivalent to a required reduction in pressure of the brake fluid applied to said first and second wheel cylinders to said master cylinder;

a second pump disposed in said second hydraulic line, delivering pressure of the brake fluid to said third and fourth wheel cylinders and returning an amount of the brake fluid equivalent to a required reduction in pressure of the brake fluid applied to said third and fourth wheel cylinders to said master cylinder;

a first suction branch line connecting the first portion of said first hydraulic line and an inlet of said first pump;

a second suction branch line connecting the first portion of said second hydraulic line and an inlet of said second pump;

a first discharge branch line connecting an outlet of said first pump and the second portion of said first hydraulic line;

a second discharge branch line connecting an outlet of said second pump and the second portion of said second hydraulic line;

a connecting line connecting the second portion of said first hydraulic line between said first differential pressure control valve and said first pressure elevation/reduction actuator set and the second portion of said second hydraulic line between said second differential pressure control valve and said second pressure elevation/reduction actuator set; and a fluid pressure difference regulator disposed in said connecting line to regulate a difference between the pressure of the brake fluid in the second portion of said first hydraulic line delivered by said first pump and the pressure of the brake fluid in the second portion of said second hydraulic line delivered by said second pump so as to fall within a given allowable pressure range.

2. A brake control apparatus as set forth in claim 1, further comprising:

a wheel speed sensor measuring speeds of the first to fourth wheels;

a lateral momentum determining circuit determining a lateral momentum of a vehicle body during traveling;

a vehicle state estimating circuit estimating a state of behavior of the vehicle body based on the speeds of the wheels measured by said wheel speed sensor and the lateral momentum determined by said lateral momentum determining circuit;

a target braking effort determining circuit determining a target braking effort to be produced by each of said first to fourth wheel cylinders based on the state of behavior of the vehicle estimated by said vehicle state estimating circuit; and braking effort regulating means for regulating the braking efforts produced by said first to fourth wheel cylinders so as to agree with the target braking efforts, respectively, to control behavior of the vehicle body.

3. A brake control apparatus as set forth in claim 2, wherein the first to fourth wheels of the vehicle consist of a pair of front right and left wheels and a pair of rear right and left wheels, and wherein said vehicle state estimating circuit includes wheel state variable determining means for determining a first diagonal wheel state variable indicative of stability in a diagonal direction of the vehicle body from the front right wheel to the rear left wheel based on a difference in speed between the front right wheel and the rear left wheel and a second diagonal wheel state variable indicative of stability in a diagonal direction of the vehicle body from the front left wheel to the rear right wheel based on a difference in speed between the front left and rear right wheels, said wheel state determining means estimating the state of behavior of the vehicle body based on the first and second diagonal wheel state variables.

4. A brake control apparatus as set forth in claim 3, wherein said vehicle state estimating circuit estimates the state of behavior of the vehicle body based on a first state variable and a second state variable, the first state variable indicating stability of a first diagonal portion of the vehicle body and being determined based on a difference between the lateral momentum and the first diagonal wheel state variable, the second state variable indicating stability of a second diagonal portion of the vehicle body and being determined based on a difference between the lateral momentum and the second diagonal wheel state variable.

5. A brake control apparatus as set forth in claim 4, wherein said vehicle state estimating circuit determines a second state parameter indicating a location of a portion of the vehicle body which is unstable in behavior of the vehicle body based on a difference between the first and second state variables and uses the second state parameter in estimating the state of behavior of the vehicle body.

6. A brake control apparatus as set forth in claim 5, wherein said vehicle state estimating circuit determines which of the wheels whose road-tire adhesion reaches a limit based on a value of the second state parameter.

7. A brake control apparatus as set forth in claim 4, wherein said vehicle state estimating circuit determines a first state parameter indicating instability of the whole of the vehicle body and a second state parameter indicating a location of a portion of the vehicle body which is unstable in behavior of the vehicle body, the first state parameter being determined by the sum of the first and second state variables, the second state parameter being determined by a difference between the first and second state variables, said vehicle state estimating circuit classifying the state of behavior of the vehicle body into a plurality of different states based on the first and second state parameters.

8. A brake control apparatus as set forth in claim 7, wherein said vehicle state estimating circuit classifies the state of behavior of the vehicle body into the different states by comparing the first state parameter with the second state parameter.

9. A brake control apparatus as set forth in claim 4, wherein said vehicle state estimating circuit determines a first state parameter indicating instability of the whole of the vehicle body based on the sum of the first and second state variables and uses the first state parameter in estimating the state of behavior of the vehicle body.

10. A brake control apparatus as set forth in claim 2, wherein the wheels of the vehicle consists of a pair of front right and left wheels and a pair of rear right and left wheels, and wherein said vehicle state estimating circuit includes wheel state variable determining means for determining a front wheel state variable based on a difference in speed between the front right and left wheels and a rear wheel state variable based on a difference in speed between the rear right and left wheels and estimates the state of behavior of the vehicle body based on the front and rear wheel state variables.

11. A brake control apparatus as set forth in claim 10, wherein said vehicle state estimating circuit estimates the state of behavior of the vehicle body based on a front state variable and a rear state variable, the front state variable indicating stability of a front portion of the vehicle body and being determined based on a difference between the lateral momentum and the front wheel state variable, the rear state variable indicating stability of a rear portion of the vehicle body and being determined based on a difference between the lateral momentum and the rear wheel state variable.

12. A brake control apparatus as set forth in claim 11, wherein said vehicle state estimating circuit determines a second state parameter indicating a location of a portion of the vehicle body which is unstable in behavior of the vehicle body based on a difference between the front and rear state variables and uses the second state parameter in estimating the state of behavior of the vehicle body.

13. A brake control apparatus as set forth in claim 12, wherein said vehicle state estimating circuit determines which of the wheels whose road-tire adhesion reaches a limit based on a value of the second state parameter.

14. A brake control apparatus as set forth in claim 11, wherein said vehicle state estimating circuit determines a first state parameter indicating instability of the whole of the vehicle body and a second state parameter indicating a location of a portion of the vehicle body which is unstable in behavior of the vehicle body, the first state parameter being determined by the sum of the front and rear state variables, the second state parameter being determined by a difference between the front and rear state variables, said vehicle state estimating circuit classifying the state of behavior of the vehicle body into a plurality of different states based on the first and second state parameters.

15. A brake control apparatus as set forth in claim 14, wherein said vehicle state estimating circuit classifies the state of behavior of the vehicle body into the different states by comparing the first state parameter with the second state parameter.

16. A brake control apparatus as set forth in claim 11, wherein said vehicle state estimating circuit determines a first state parameter indicating instability of the whole of the vehicle body based on the sum of the front and rear state variables and uses the first state parameter in estimating the state of behavior of the vehicle body.

17. A brake control apparatus as set forth in claim 2, wherein said vehicle state estimating circuit includes wheel state variable determining means for determining a wheel state variable based on a difference in speed between a right one of the wheels and a left one of the wheels and estimates the state of behavior of the vehicle body based on the wheel state variable.

18. A brake control apparatus as set forth in claim 2, wherein said lateral momentum determining circuit includes one of a lateral acceleration sensor measuring a lateral acceleration acting on the vehicle body and a yaw rate sensor measuring a yaw rate of angular motion applied to the vehicle body.

19. A brake control apparatus as set forth in claim 2, further comprising turning state detecting means for detecting a state of turning of the vehicle, and wherein said target braking effort determining circuit determines the target braking effort depending upon the state of turning of the vehicle.

20. A brake control apparatus as set forth in claim 1, further comprising an electronic control unit which performs brake assisting control to actuate said first and second differential pressure control valves electrically so that the differences in pressure of the brake fluid between the first and second portions of said first hydraulic line and between the first and second portions of the second hydraulic line reach a target level when a brake pedal is depressed by a vehicle operator and when the vehicle is traveling at a speed higher than a preselected value.

21. A brake control apparatus as set forth in claim 20, wherein said electronic control unit actuates said first and second pumps and said first and second differential pressure control valves in the brake assisting control when the pressure of the brake fluid in said master cylinder increases above a given level.

22. A brake control apparatus as set forth in claim 21, wherein said electronic control unit actuates said first and second pumps and said first and second differential pressure control valves in the brake assisting control to have the differences in pressure of the brake fluid between the first and second portions of said first hydraulic line and between the first and second portions of said second hydraulic line for elevating the pressures in the brake fluid in the second portions of said first and second hydraulic lines above the pressure of the brake fluid in said master cylinder reach the target level which is increased as a function of an increase in pressure of the brake fluid in said master cylinder.

23. A brake control apparatus as set forth in claim 22, wherein said check valve includes a valve body which is responsive to one of the pressure of the brake fluid produced by said master cylinder and the pressure of the brake fluid in said first and second wheel cylinders delivered by said first pump to block said third suction branch line.

24. A brake control apparatus as set forth in claim 20, further comprising a master cylinder pressure sensor measuring the pressure of the brake fluid in said master cylinder to provide a signal indicative thereof, and wherein said electronic control unit determines a rate of change in pressure of the brake fluid in said master cylinder based on the signal outputted from said master cylinder pressure sensor, when the rate of change exceeds a given value, said electronic control unit actuating said first and second pumps and said first and second differential pressure control valves in the brake assisting control.

25. A brake control apparatus as set forth in claim 20, wherein said electronic control unit actuates said first and second pumps and said first and second differential pressure control valves in the brake assisting control if one of a first condition in which the pressure of the brake fluid in said master cylinder is increased above a given level and a second condition in which a rate of change in pressure of the brake fluid in said master cylinder exceeds a given value is met.

26. A brake control apparatus as set forth in claim 1, wherein said fluid pressure difference regulator includes a pressure chamber and a piston disposed within the pressure chamber to block fluid communication between the first and second hydraulic lines, the piston being slidable within the pressure chamber so as to eliminate an excess of the pressure difference between the first and second hydraulic lines above the given allowable pressure range.

27. A brake control apparatus as set forth in claim 26, wherein said fluid pressure difference regulator also includes a spring which has a preselected spring constant and which supports the piston within the pressure chamber.

28. A brake control apparatus as set forth in claim 27, wherein the spring constant of said spring is set to a value which has the pressure difference between said first and second hydraulic lines fall within said given allowable pressure range.

29. A brake control apparatus as set forth in claim 26, wherein the pressure chamber of said fluid pressure difference regulator has a volume which allows a desired pressure of the brake fluid to be produced in the second portion of one of said first and second hydraulic lines if the other of said first and second hydraulic line is failing.

30. A brake control apparatus as set forth in claim 1, wherein said first and second suction lines are connected so as to apply the pressure of the brake fluid delivered by said master cylinder to said check valve.

31. A brake control apparatus as set forth in claim 30, wherein said first and second suction line have a common portion leading to the inlet of said pump.

32. A brake control apparatus as set forth in claim 30, further comprising a control valve disposed in said first suction line which closes said first suction line when said master cylinder delivers no pressure and opens said first suction line when said master cylinder delivers the pressure of the brake fluid.

33. A brake control apparatus as set forth in claim 1, wherein said check valve prohibits flow of the brake fluid from said master reservoir to the inlet of said pump when said master cylinder delivers the pressure of the brake fluid, while allowing the brake fluid to flow from said master reservoir to the inlet of said pump when said master cylinder does not delivers the pressure of the brake fluid.

34. A brake control apparatus as set forth in claim 1, further comprising a switch reservoir disposed in said first suction line which establishes fluid communication between said master cylinder and the inlet of said pump when said master cylinder delivers no pressure of the brake fluid and blocks the fluid communication in response to the pressure of the brake fluid produced by said master cylinder.

35. A brake control apparatus as set forth in claim 1, wherein said first pressure elevation/reduction actuator set includes a plurality of pressure elevation control valves which control elevations in pressure of the brake fluid applied to said first and second wheel cylinders, respectively, and a plurality of pressure reduction control valves which control reductions in pressure of the brake fluid in said first and second wheel cylinders, respectively, and wherein said second pressure elevation/reduction actuator set includes a plurality of pressure elevation control valves which control elevations in pressure of the brake fluid applied to said third and fourth wheel cylinders, respectively, and a plurality of pressure reduction control valves which control reductions in pressure of the brake fluid in said third and fourth wheel cylinders, respectively.

36. A brake control apparatus as set forth in claim 1, further comprising a master reservoir storing therein the brake fluid to be supplied to and returned from said master cylinder, a third suction branch line connecting said master reservoir and the inlet of said first pump, and a check valve disposed in said third suction branch line, mechanically allowing the brake fluid to flow from said master reservoir to said first pump and blocking flow of the brake fluid to said master cylinder from said first pump.

37. A brake control apparatus for a vehicle comprising:
a master reservoir storing therein a brake fluid;
a master cylinder connecting with said master reservoir, delivering pressure of the brake fluid to wheel cylinders when braking the vehicle;
a plurality of pressure control actuators disposed between said master cylinder and the wheel cylinders to selectively increase and decrease pressures of the brake fluid applied to the wheel cylinders respectively;
a differential pressure control valve disposed between said master cylinder and said pressure control actuators to regulate flow of the brake fluid and control a difference in pressure between a hydraulic line connecting with said master cylinder and a hydraulic line connecting with said pressure control actuators;
a pump applying pressure of the brake fluid to the wheel cylinders and returning an amount of the brake fluid equivalent to a required reduction in pressure of the brake fluid applied to said wheel cylinders to said master cylinder;
a first suction line extending from the hydraulic line connecting with said master cylinder to an inlet of said pump;
a second suction line connecting said master reservoir and the inlet of said pump;
a check valve disposed in said second suction line, allowing the brake fluid to flow only to the inlet of said pump from said master reservoir; and
a switch reservoir disposed in said first suction line which establishes fluid communication between said master cylinder and the inlet of said pump when said master cylinder delivers no pressure of the brake fluid and blocks the fluid communication in response to the pressure of the brake fluid produced by said master cylinder.

38. A brake control apparatus as set forth in claim 37, further comprising:
   a wheel speed sensor measuring speeds of the wheels;
   a lateral momentum determining circuit determining a lateral momentum of a vehicle body during traveling;
   a vehicle state estimating circuit estimating a state of behavior of the vehicle body based on the speeds of the wheels measured by said wheel speed sensor and the lateral momentum determined by said lateral momentum determining circuit;
   a target braking effort determining circuit determining a target braking effort to be produced by each of said first to fourth wheel cylinders based on the state of behavior of the vehicle estimated by said vehicle state estimating circuit; and
   braking effort regulating means for regulating the braking efforts produced by said first to fourth wheel cylinders so as to agree with the target braking efforts, respectively, to control behavior of the vehicle body.

39. A brake control apparatus as set forth in claim 38, wherein the wheels of the vehicle consists of a pair of front right and left wheels and a pair of rear right and left wheels, and wherein said vehicle state estimating circuit includes wheel state variable determining means for determining a front wheel state variable based on a difference in speed between the front right and left wheels and a rear wheel state variable based on a difference in speed between the rear right and left wheels and estimates the state of behavior of the vehicle body based on the front and rear wheel state variables.

40. A brake control apparatus as set forth in claim 39, wherein said vehicle state estimating circuit estimates the state of behavior of the vehicle body based on a front state variable and a rear state variable, the front state variable indicating stability of a front portion of the vehicle body and being determined based on a difference between the lateral momentum and the front wheel state variable, the rear state variable indicating stability of a rear portion of the vehicle body and being determined based on a difference between the lateral momentum and the rear wheel state variable.

41. A brake control apparatus as set forth in claim 40, wherein said vehicle state estimating circuit determines a second state parameter, indicating a location of a portion of the vehicle body which is unstable in behavior of the vehicle body based on a difference between the front and rear state variables and uses the second state parameter in estimating the state of behavior of the vehicle body.

42. A brake control apparatus as set forth in claim 41, wherein said vehicle state estimating circuit determines which of the wheels whose road-tire adhesion reaches a limit based on a value of the second state parameter.

43. A brake control apparatus as set forth in claim 40, wherein said vehicle state estimating circuit determines a first state parameter indicating instability of the whole of the vehicle body and a second state parameter indicating a location of a portion of the vehicle body which is unstable in behavior of the vehicle body, the first state parameter being determined by the sum of the front and rear state variables, the second state parameter being determined by a difference between the front and rear state variables, said vehicle state estimating circuit classifying the state of behavior of the vehicle body into a plurality of different states based on the first and second state parameters.

44. A brake control apparatus as set forth in claim 43, wherein said vehicle state estimating circuit classifies the state of behavior of the vehicle body into the different states by comparing the first state parameter with the second state parameter.

45. A brake control apparatus as set forth in claim 40, wherein said vehicle state estimating circuit determines a first state parameter indicating instability of the whole of the vehicle body based on the sum of the front and rear state variables and uses the first state parameter in estimating the state of behavior of the vehicle body.

46. A brake control apparatus as set forth in claim 38, wherein the wheels of the vehicle consists of a pair of front right and left wheels and a pair of rear right and left wheels, and wherein said vehicle state estimating circuit includes wheel state variable determining means for determining a first diagonal wheel state variable indicative of stability in a diagonal direction of the vehicle body from the front right wheel to the rear left wheel based on a difference in speed between the front right wheel and the rear left wheel and a second diagonal wheel state variable indicative of stability in a diagonal direction of the vehicle body from the front left wheel to the rear right wheel based on a difference in speed between the front left and rear right wheels, said wheel state determining means estimating the state of behavior of the vehicle body based on the first and second diagonal wheel state variables.

47. A brake control apparatus as set forth in claim 46, wherein said vehicle state estimating circuit estimates the state of behavior of the vehicle body based on a first state variable and a second state variable, the first state variable indicating stability of a first diagonal portion of the vehicle body and being determined based on a difference between the lateral momentum and the first diagonal wheel state variable, the second state variable indicating stability of a second diagonal portion of the vehicle body and being determined based on a difference between the lateral momentum and the second diagonal wheel state variable.

48. A brake control apparatus as set forth in claim 47, wherein said vehicle state estimating circuit determines a second state parameter indicating a location of a portion of the vehicle body which is unstable in behavior of the vehicle body based on a difference between the first and second state variables and uses the second state parameter in estimating the state of behavior of the vehicle body.

49. A brake control apparatus as set forth in claim 48, wherein said vehicle state estimating circuit determines which of the wheels whose road-tire adhesion reaches a limit based on a value of the second state parameter.

50. A brake control apparatus as set forth in claim 47, wherein said vehicle state estimating circuit determines a first state parameter indicating instability of the whole of the vehicle body and a second state parameter indicating a location of a portion of the vehicle body which is unstable in behavior of the vehicle body, the first state parameter being determined by the sum of the first and second state variables, the second state parameter being determined by a difference between the first and second state variables, said vehicle state estimating circuit classifying the state of behavior of the vehicle body into a plurality of different states based on the first and second state parameters.

51. A brake control apparatus as set forth in claim 50, wherein said vehicle state estimating circuit classifies the state of behavior of the vehicle body into the different states by comparing the first state parameter with the second state parameter.

52. A brake control apparatus as set forth in claim 47, wherein said vehicle state estimating circuit determines a first state parameter indicating instability of the whole of the vehicle body based on the sum of the first and second state variables and uses the first state parameter in estimating the state of behavior of the vehicle body.

53. A brake control apparatus as set forth in claim 38, wherein said vehicle state estimating circuit includes wheel state variable determining means for determining a wheel state variable based on a difference in speed between a right one of the wheels and a left one of the wheels and estimates the state of behavior of the vehicle body based on the wheel state variable.

54. A brake control apparatus as set forth in claim 38, further comprising turning state detecting means for detecting a state of turning of the vehicle, and wherein said target braking effort determining circuit determines the target braking effort depending upon the state of turning of the vehicle.

55. A brake control apparatus as set forth in claim 38, wherein said lateral momentum determining circuit includes one of a lateral acceleration sensor measuring a lateral acceleration acting on the vehicle body and a yaw rate sensor measuring a yaw rate of angular motion applied to the vehicle body.

56. A brake control apparatus as set forth in claim 32, wherein said first and second suction lines are connected so as to apply the pressure of the brake fluid delivered by said master cylinder to said check valve.

57. A brake control apparatus as set forth in claim 56, wherein said first and second suction line have a common portion leading to the inlet of said pump.

58. A brake control apparatus as set forth in claim 56, further comprising a control valve disposed in said first suction line which closes said first suction line when said master cylinder delivers no pressure and opens said first suction line when said master cylinder delivers the pressure of the brake fluid.

59. A brake control apparatus as set forth in claim 37, wherein said check valve prohibits flow of the brake fluid from said master reservoir to the inlet of said pump when said master cylinder delivers the pressure of the brake fluid, while allowing the brake fluid to flow from said master reservoir to the inlet of said pump when said master cylinder does not delivers the pressure of the brake fluid.

* * * * *